US011115172B2

(12) United States Patent
Park et al.

(10) Patent No.: US 11,115,172 B2
(45) Date of Patent: Sep. 7, 2021

(54) METHOD FOR TRANSMITTING AND RECEIVING MULTICAST/BROADCAST DATA IN WIRELESS COMMUNICATION SYSTEM, AND APPARATUS THEREFOR

(71) Applicant: LG Electronics Inc., Seoul (KR)

(72) Inventors: Jonghyun Park, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 16/310,278

(22) PCT Filed: Jun. 14, 2017

(86) PCT No.: PCT/KR2017/006165
§ 371 (c)(1),
(2) Date: Dec. 14, 2018

(87) PCT Pub. No.: WO2017/217748
PCT Pub. Date: Dec. 21, 2017

(65) Prior Publication Data
US 2019/0158259 A1     May 23, 2019

Related U.S. Application Data

(60) Provisional application No. 62/350,170, filed on Jun. 14, 2016.

(51) Int. Cl.
*H04W 4/00*     (2018.01)
*H04L 5/00*     (2006.01)
(Continued)

(52) U.S. Cl.
CPC ......... *H04L 5/0094* (2013.01); *H04B 7/0626* (2013.01); *H04L 1/0061* (2013.01);
(Continued)

(58) Field of Classification Search
CPC . H04B 7/0626; H04L 1/0061; H04L 27/2607; H04L 5/001; H04L 5/0048; H04L 5/0094
See application file for complete search history.

(56) References Cited

U.S. PATENT DOCUMENTS

2009/0252077 A1   10/2009   Khandekar et al.
2011/0090983 A1*   4/2011   Zhang ................. H04L 27/2607
                                                    375/295

(Continued)

FOREIGN PATENT DOCUMENTS

KR     WO2015005609 A1 *   1/2015        ........... H04W 24/10

OTHER PUBLICATIONS

Ericsson, "NB-IoT—NB-PBCH design,'"R1-160259', 3GPP TSG-RAN WG1 Meeting #84, Feb. 6, 2016, 6 pages.
(Continued)

*Primary Examiner* — Abdelillah Elmejjarmi
(74) *Attorney, Agent, or Firm* — Fish & Richardson P.C.

(57) ABSTRACT

Disclosed are a method for transmitting and receiving multicast/broadcast data in a wireless communication system, and an apparatus therefore. Specifically, a method by which a station transmits a reference signal for demodulating multicast/broadcast data in a wireless communication system comprises the steps of: mapping a first reference signal within a control channel region consisting of at least one symbol used for transmission of a control channel within a subframe; and mapping a second reference signal transmitted from multiple cells for demodulating a multicast/broadcast channel within a data channel region excluding the control channel region within at least one resource block which has been allocated for transmission of the multicast/broadcast channel which carries the multicast/broadcast data transmitted from the multiple cells within the subframe, wherein scheduling information for allocating at least one (Continued)

resource block where the multicast/broadcast channel is mapped may be transmitted in the control channel.

12 Claims, 16 Drawing Sheets

(51) Int. Cl.
| | |
|---|---|
| *H04W 76/11* | (2018.01) |
| *H04B 7/06* | (2006.01) |
| *H04L 1/00* | (2006.01) |
| *H04L 27/26* | (2006.01) |
| *H04W 4/06* | (2009.01) |
| *H04W 24/08* | (2009.01) |
| *H04W 72/04* | (2009.01) |
| *H04B 7/02* | (2018.01) |

(52) U.S. Cl.
CPC .......... *H04L 5/0044* (2013.01); *H04L 5/0048* (2013.01); *H04L 5/0053* (2013.01); *H04L 27/2607* (2013.01); *H04W 4/06* (2013.01); *H04W 24/08* (2013.01); *H04W 72/042* (2013.01); *H04W 72/0446* (2013.01); *H04W 72/0453* (2013.01); *H04W 76/11* (2018.02); *H04B 7/02* (2013.01); *H04L 1/0072* (2013.01); *H04L 5/001* (2013.01)

(56) References Cited

U.S. PATENT DOCUMENTS

| | | | |
|---|---|---|---|
| 2011/0158200 A1 | 6/2011 | Bachu et al. | |
| 2012/0155414 A1* | 6/2012 | Noh | H04L 5/0048 370/329 |
| 2012/0329400 A1* | 12/2012 | Seo | H04L 5/00 455/63.1 |
| 2013/0114498 A1* | 5/2013 | Park | H04W 4/06 370/312 |
| 2014/0050187 A1* | 2/2014 | Nakshima | H04L 5/0048 370/329 |
| 2014/0204825 A1 | 7/2014 | Ekpenyong et al. | |

OTHER PUBLICATIONS

Nokia Networks, "NB-PBCH design for NB-IoT,"'R1-160441', 3GPP TSG-RAN WG1 Meeting #84, Feb. 5, 2016, 5 pages.

* cited by examiner (a)

(b)

METHOD FOR TRANSMITTING AND RECEIVING MULTICAST/BROADCAST DATA IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2017/006165, filed on Jun. 14, 2017, which claims the benefit of U.S. Provisional Application No. 62/350,170, filed on Jun. 14, 2016. The disclosures of the prior applications are incorporated by reference in their entirety.

TECHNICAL FIELD

The present invention relates to a wireless communication system and, more particularly, to a method for transmitting/receiving multicast/broadcast data at/from a multi-cell or a multi-transmission point and an apparatus supporting the same.

BACKGROUND ART

A mobile communication system has been developed to provide a voice service while guaranteeing user mobility. However, the mobile communication system has been extended a service range to a data service as well as a voice, and nowadays, a resource shortage phenomenon occurs due to explosive traffic increase and users request a higher speed service and thus a more enhanced mobile communication system is required.

A next generation mobile communication system should be able to support acceptance of explosive data traffic, epochal increase of a transmission rate per user, acceptance of the largely increased connection device number, very low end-to-end latency, and high energy efficiency. For this reason, various technologies such as dual connectivity, Massive Multiple Input Multiple Output (Massive MIMO), In-band Full Duplex, Non-Orthogonal Multiple Access (NOMA), Super wideband support, and Device Networking have been researched.

DISCLOSURE

Technical Problem

An object of the present invention is to provide a method for transmitting/receiving multicast/broadcast data at/from a multi-cell or a multi-transmission point in a wireless communication system.

The present invention proposes a method of transmitting multicast/broadcast data to a terminal located in a given area on the basis of a point at which the multicast/broadcast data has been generated.

Technical objects to be achieved in the present invention are not limited to the above-described technical objects, and other technical objects not described above may be evidently understood by a person having ordinary skill in the art to which the present invention pertains from the following description.

Technical Solution

In an aspect of the present invention, a method for a base station to transmit a reference signal for multicast/broadcast data demodulation in a wireless communication system includes mapping a first reference signal within a control channel region configured with one or more symbols used for control channel transmission within a subframe and mapping a second reference signal transmitted from multiple cells for demodulation of a multicast/broadcast channel within a data channel region other than the control channel region within one or more resource blocks allocated for transmission of the multicast/broadcast channel carrying multicast/broadcast data transmitted from multiple cells within the subframe. Scheduling information for allocating one or more resource blocks to which the multicast/broadcast channel is mapped may be transmitted in the control channel.

In another aspect of the present invention, a method for a user equipment to receive a reference signal for multicast/broadcast data demodulation in a wireless communication system includes receiving a first reference signal within a control channel region configured with one or more symbols used for control channel transmission within a subframe and receiving a second reference signal transmitted from multiple cells for demodulation of a mapped multicast/broadcast channel within a data channel region other than the control channel region within one or more resource blocks allocated for transmission of the multicast/broadcast channel carrying multicast/broadcast data transmitted from multiple cells within the subframe. Scheduling information for allocating one or more resource blocks to which the multicast/broadcast channel is mapped may be transmitted in the control channel.

Preferably, a seed value for generating the sequence of the first reference signal and the second reference signal, the number of antenna ports in which the first reference signal and the second reference signal are transmitted, frequency shift value and/or a time shift value applied to determine resource elements to which the first reference signal and the second reference signal are mapped may be independently determined.

Preferably, the first reference signal may also be mapped within the data channel region if different frequency shift values and/or time shift values are applied to determine the resource elements to which the first reference signal and the second reference signal are mapped.

Preferably, information on a resource element to which the first reference signal is mapped may be transmitted to the user equipment in all cells participating in the transmission of the multicast/broadcast data for each subframe by the base station.

Preferably, in a subframe or carrier in which the control channel region is not present, the second reference signal may be mapped to the resource location of the control channel region.

Preferably, information about whether the second reference signal is mapped to only the data channel region or also mapped to the resource location of the control channel region may be transmitted to the user equipment by the base station.

Preferably, if a starting symbol where the mapping of the multicast/broadcast channel within the subframe starts is a first symbol within the subframe, the second reference signal may also be mapped to the resource location of the control channel region, and if not, the second reference signal may be mapped to only the data channel region.

Preferably, if a time shift value is applied to determine a resource element to which the second reference signal is mapped, the time shift value may be applied to the remaining symbols other than a first symbol to which the second reference signal is mapped within the subframe.

Preferably, if a time shift value is applied to determine a resource element to which the second reference signal is mapped, the time shift value may not be applied to a symbol out of the boundary of the subframe when the time shift value is applied.

Preferably, if the second reference signal is transmitted in a first antenna port, the second reference signal may be mapped to a resource element for the first antenna port and a predefined resource element associated with the resource element for the first antenna port.

Preferably, the first reference signal may be a cell-specific reference signal (CRS) or a demodulation reference signal (DMRS).

Preferably, a cyclic prefix length of the subframe to which the multicast/broadcast channel is mapped may be the same as a physical downlink shared channel (PDSCH).

Advantageous Effects

In accordance with an embodiment of the present invention, multicast/broadcast data can be efficiently transmitted by reusing the existing PDSCH structure.

Furthermore, the implementation complexity of a terminal for the reception of multicast/broadcast data can be reduced by reusing the existing PDSCH structure.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompany drawings, which are included to provide a further understanding of the present invention and are incorporated on and constitute a part of this specification illustrate embodiments of the present invention and together with the description serve to explain the principles of the present invention.

MODE FOR INVENTION

Figure 1:
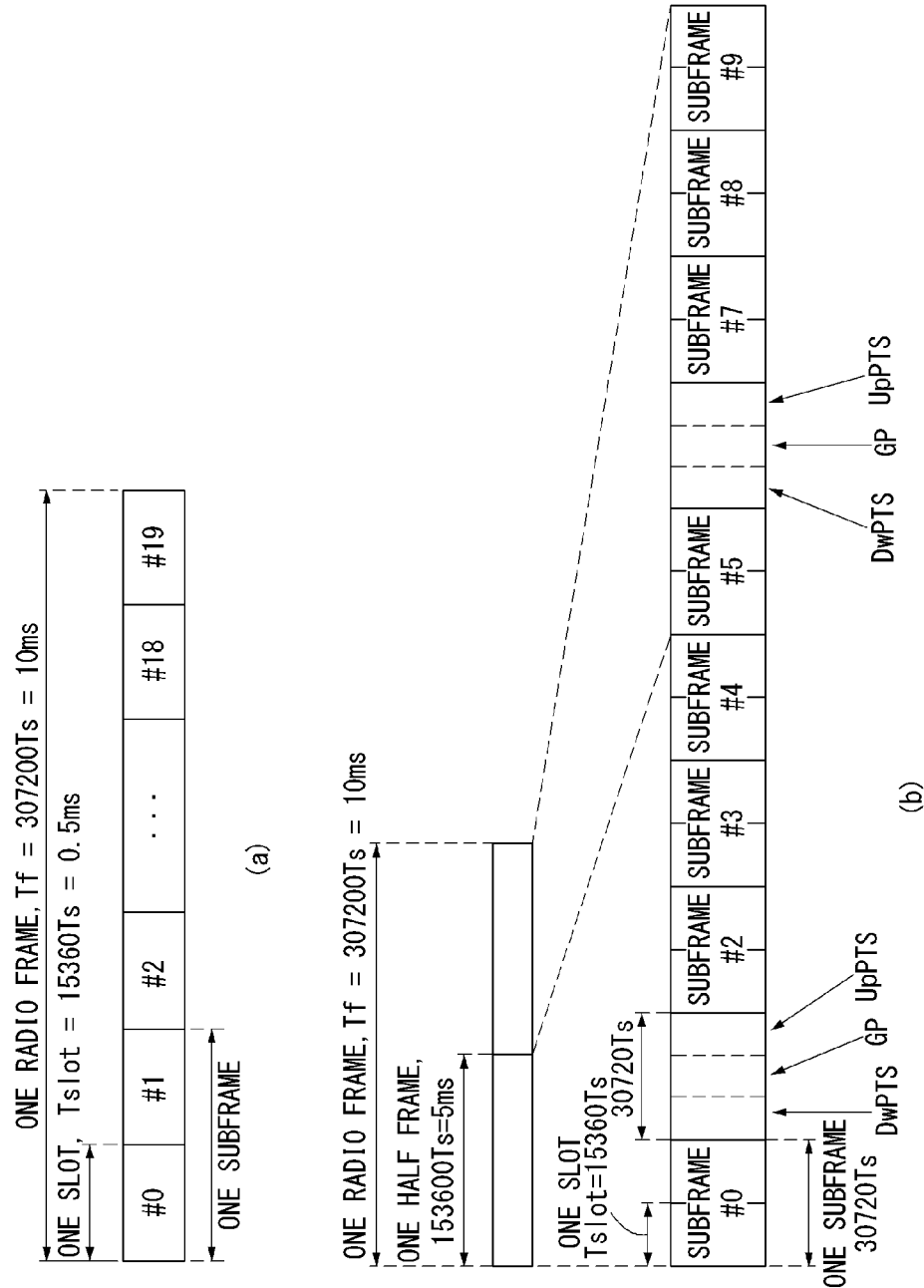
FIG. 1 illustrates the structure of a radio frame in a wireless communication system to which the present invention may be applied.

Hereinafter, preferred embodiments of the present invention will be described in detail with reference to the accompanying drawings. A detailed description to be disclosed herein together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. CDMA may be implemented by radio technology universal terrestrial radio access (UTRA) or CDMA2000. TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

Table 2 illustrates the configuration (the length of DwPTS/GP/UpPTS) of a special subframe tion information, or an uplink transmission (Tx) power control command for a predetermined terminal group.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame is just one example and the number subcarriers included in the radio frame or the number of slots included in the subframe and the number of OFDM symbols included in the slot may be variously changed.

Figure 2:
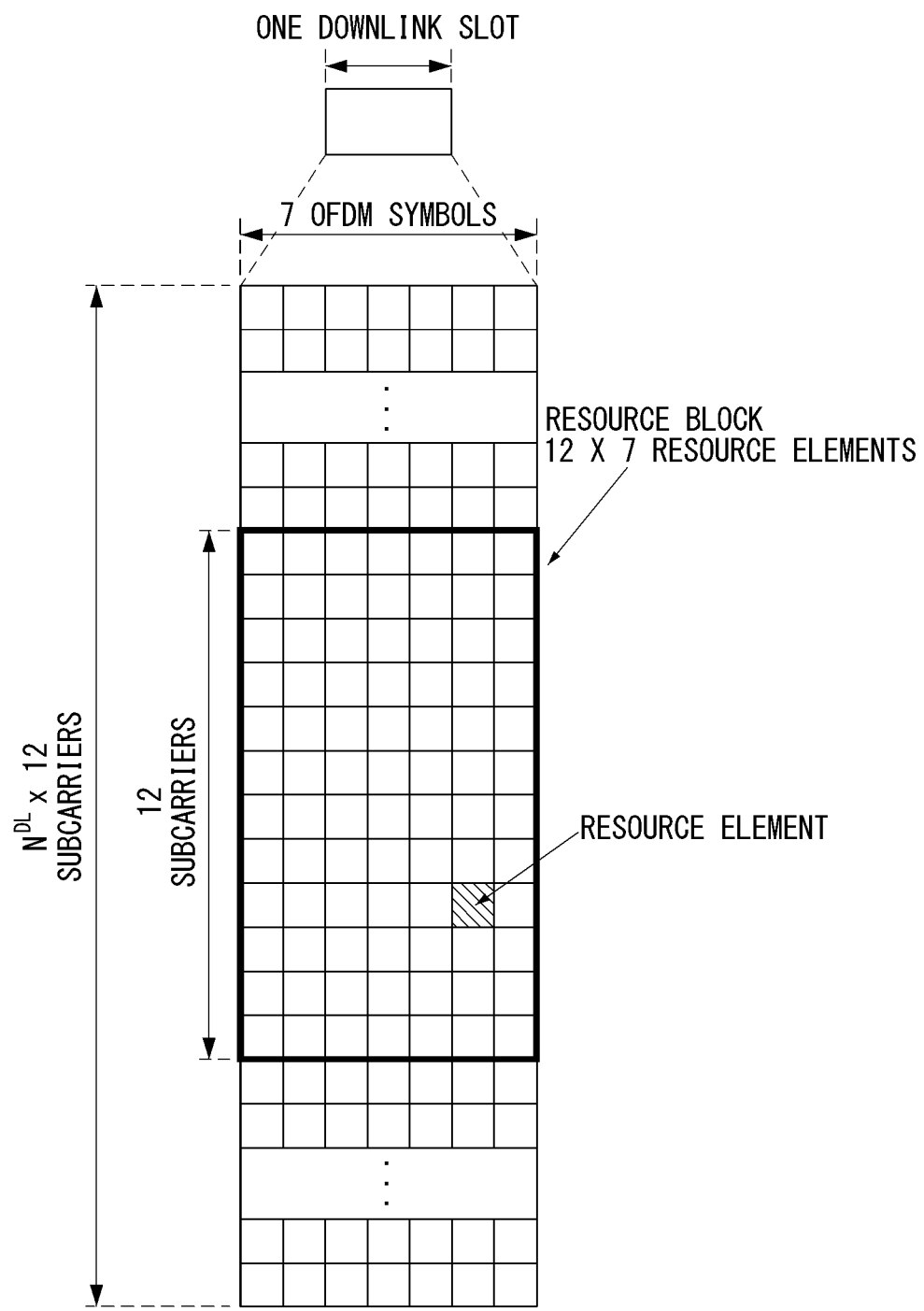
FIG. 2 is a diagram illustrating a resource grid for a downlink slot in a wireless communication system to which the present invention may be applied.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, N^DL is subordinated to a downlink transmission bandwidth.

A structure of the uplink slot may be the same as that of the downlink slot.

Figure 3:
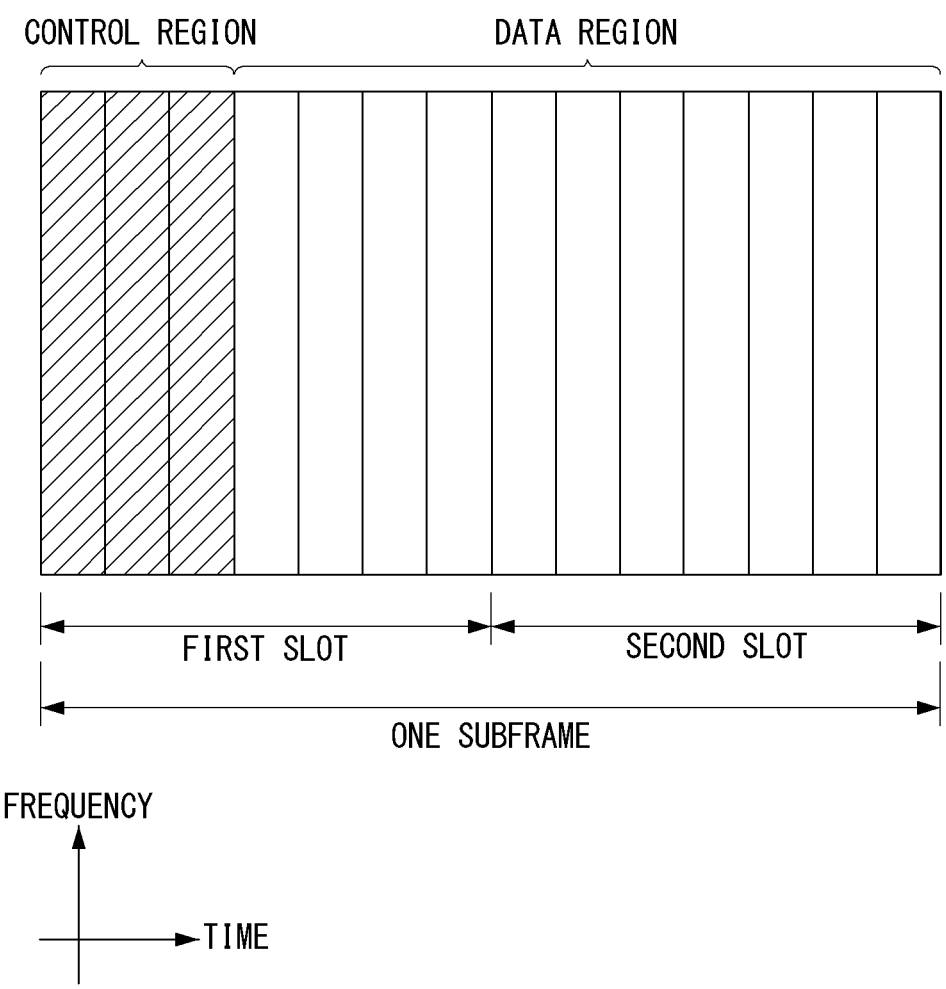
FIG. 3 illustrates a structure of downlink subframe in a wireless communication system to which the present invention may be applied.

FIG. 3 illustrates a structure of a downlink subframe in the wireless communication system to which the present invention can be applied.

Referring to FIG. 3, a maximum of former three OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARD). Control information transmitted through a PDCCH is referred to as downlink control information (DCI). The downlink control information includes uplink resource allocation information, downlink resource alloca- The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
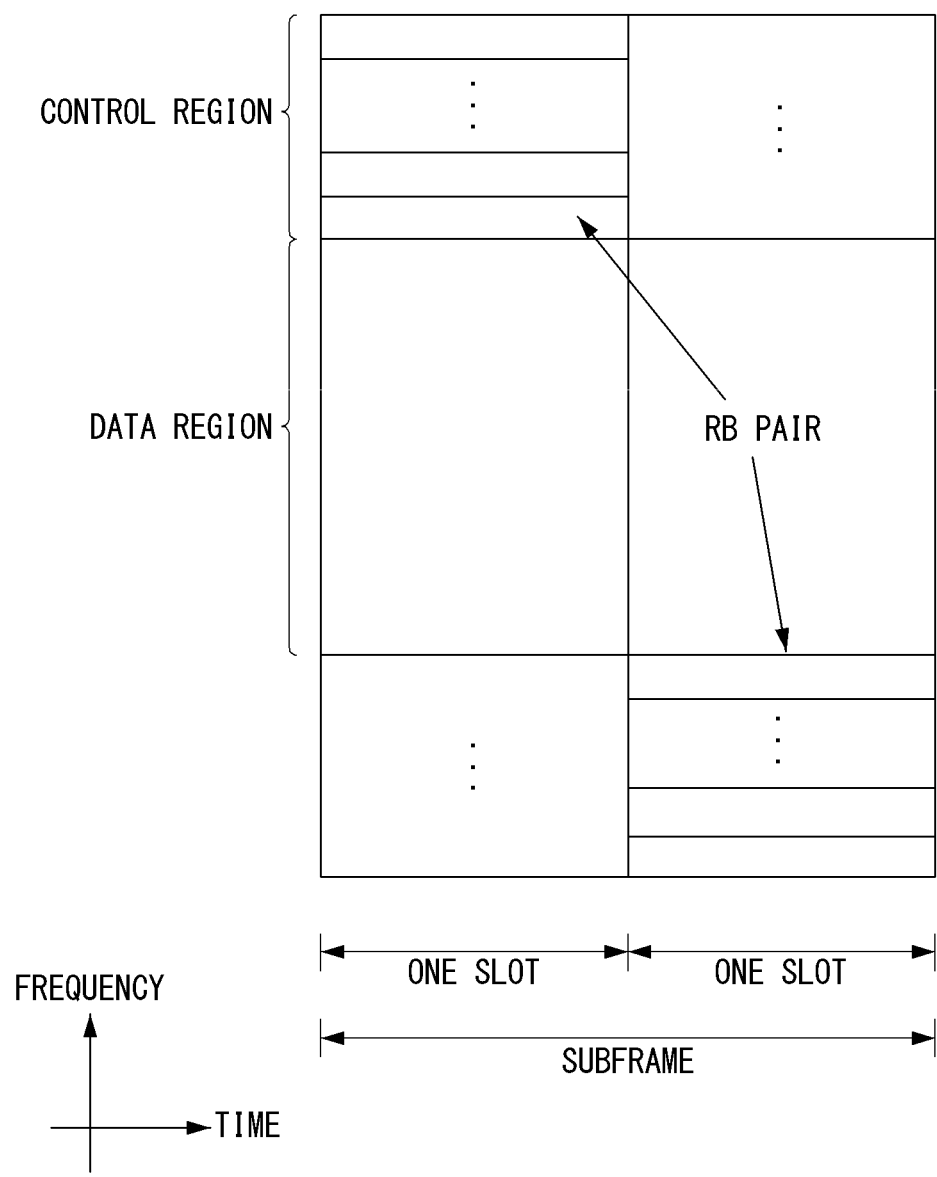
FIG. 4 illustrates a structure of uplink subframe in a wireless communication system to which the present invention may be applied.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

Overview of Carrier Aggregation

A communication environment considered in embodiments of the present invention includes all multi-carrier support environments. That is, a multi-carrier system or carrier aggregation (CA) system used in the present invention is a system in which, when a target wide band is configured, one or more component carriers (CCs) having a bandwidth smaller than a target bandwidth are aggregated and used in order to support a wide band.

In the present invention, multi-carriers refer to aggregation (or carrier aggregation) of carriers and in this case, the aggregation of the carriers refers to both aggregation of contiguous carriers and aggregation of non-contiguous carriers. Further, the number of components carriers aggregated between the downlink and the uplink may be set differently. A case where the number of downlink component carriers (hereinafter, referred to as 'DL CC') is equal to the number of uplink component carriers (hereinafter, referred to as 'UL CC') is referred to as symmetric aggregation and a case where the number of downlink CCs is different from the number of uplink CCs is referred to as asymmetric aggregation. Such carrier aggregation may be used interchangeably with terms such as carrier aggregation, bandwidth aggregation, spectrum aggregation, and the like.

Carrier aggregation configured by combining two or more component carriers aims at supporting up to 100 MHz bandwidth in the LTE-A system. When one or more carriers having a bandwidth smaller than the target bandwidth are combined, the bandwidth of the combined carriers may be limited to the bandwidth used in the existing system in order to maintain backward compatibility with the existing IMT system. For example, in the existing 3GPP LTE system, {1.4, 3, 5, 10, 15, 20} MHz bandwidth is supported and in 3GPP LTE-advanced system (that is, LTE-A), a bandwidth larger than 20 MHz may be supported by using only the bandwidths for compatibility with the existing system. Further, the carrier aggregation system used in the present invention may support the carrier aggregation by defining a new bandwidth regardless of the bandwidth used in the existing system.

The LTE-A system uses a concept of a cell to manage radio resources.

The aforementioned carrier aggregation environment may be referred to as a multiple-cell environment. The cell is defined as a combination of a pair of a downlink resource (DL CC) and an uplink resource (UL CC), but the uplink resource is not required. Accordingly, the cell may be constituted by the downlink resource along or by the downlink resource and the uplink resource. When a specific user equipment has only one configured serving cell, the specific user equipment may have one DL CC and one UL CC, but when the specific user equipment has two or more configured serving cells, the specific user equipment may have DL CCs as many as the cells and the number of UL CCs may be equal to or smaller than the number of DL CCs.

Alternatively, on the contrary, the DL CC and the UL CC may be configured. That is, when the specific user equipment has multiple configured serving cells, a carrier aggregation environment in which the number of UL CCs is larger than the number of DL CCs may also be supported. That is, the carrier aggregation may be appreciated as aggregation of two or more different cells having carrier frequencies (center frequency of the cell), respectively. In this case, the term 'cell' needs to be distinguished from a 'cell' as an area covered by the eNB which is generally used.

The cell used in the LTE-A system includes a primary cell (PCell) and a secondary cell (SCell). The P cell and the S cell may be used as the serving cell. In the case of a user equipment which is in an RRC_CONNECTED state, but does not configure the carrier aggregation or does not support the carrier aggregation, only one serving cell configured only by the P cell exists. On the contrary, in the case of a user equipment which is in the RRC_CONNECTED state and configures the carrier aggregation, one or more serving cells may exist and the entire serving cell includes the P cell and one or more S cells.

The serving cell (P cell and S cell) may be configured through an RRC parameter. PhysCellId has integer values of 0 to 503 as a physical layer identifier of the cell. SCellIndex has integer values of 1 to 7 as a short identifier used for identifying the S cell. ServCellIndex has integer values of 0 to 7 as a short identifier used for identifying the serving cell (P cell or S cell). The 0 value is applied to the P cell and SCellIndex is previously granted to be applied to the S cell. That is, a cell having the smallest cell ID (or cell index) in ServCellIndex becomes the P cell.

The P cell refers to a cell operating on a primary frequency (or primary CC). The user equipment may be used to perform an initial connection establishment process or a connection re-establishment process and may refer to a cell indicated during a handover process. Further, the P cell refers to a cell which becomes a center of control related communication among the serving cells configured in the carrier aggregation environment. That is, the user equipment may be allocated the PUCCH only in the P cell thereof and may transmit the allocated PUCCH and may use only the P cell for acquiring system information or changing a monitoring procedure. Evolved Universal Terrestrial Radio Access (E-UTRAN) may change only the P cell for the handover procedure by using an RRC connection reconfiguration message of a higher layer, which includes mobility control information to the user equipment that supports the carrier aggregation environment.

The S cell refers to a cell operating on a second frequency (or secondary CC). Only one P cell may be allocated to the specific user equipment and one or more S cells may be allocated to the specific user equipment. The S cell may be configured after the RRC connection is configured and may be used to provide an additional radio resource. The PUCCH does not exist in remaining cells other than the P cell among the serving cells configured in the carrier aggregation environment, that is, the S cell. When the E-UTRAN adds the S cell to the user equipment supporting the carrier aggregation environment, the E-UTRAN may provide all the system information related to the operation of a related cell which is in the RRC_CONNECTED state through a dedicated signal. The change of the system information may be controlled by releasing and adding the related S cell and the RR connection reconfiguration message of the higher layer may be used at this time. The E-UTRAN may perform dedicated signaling with different parameters for each user equipment rather than broadcasting within the related Scell.

After an initial security activation process starts, the E-UTRAN may configure a network including one or more S cells in addition to the P cell initially configured in the connection configuration process. In the carrier aggregation environment, the P cell and the S cell may operate as respective component carriers. In the following embodiments, the primary component carrier (PCC) may be used in the same meaning as the P cell and the secondary component carrier (SCC) may be used in the same meaning as the Scell.

Figure 5:
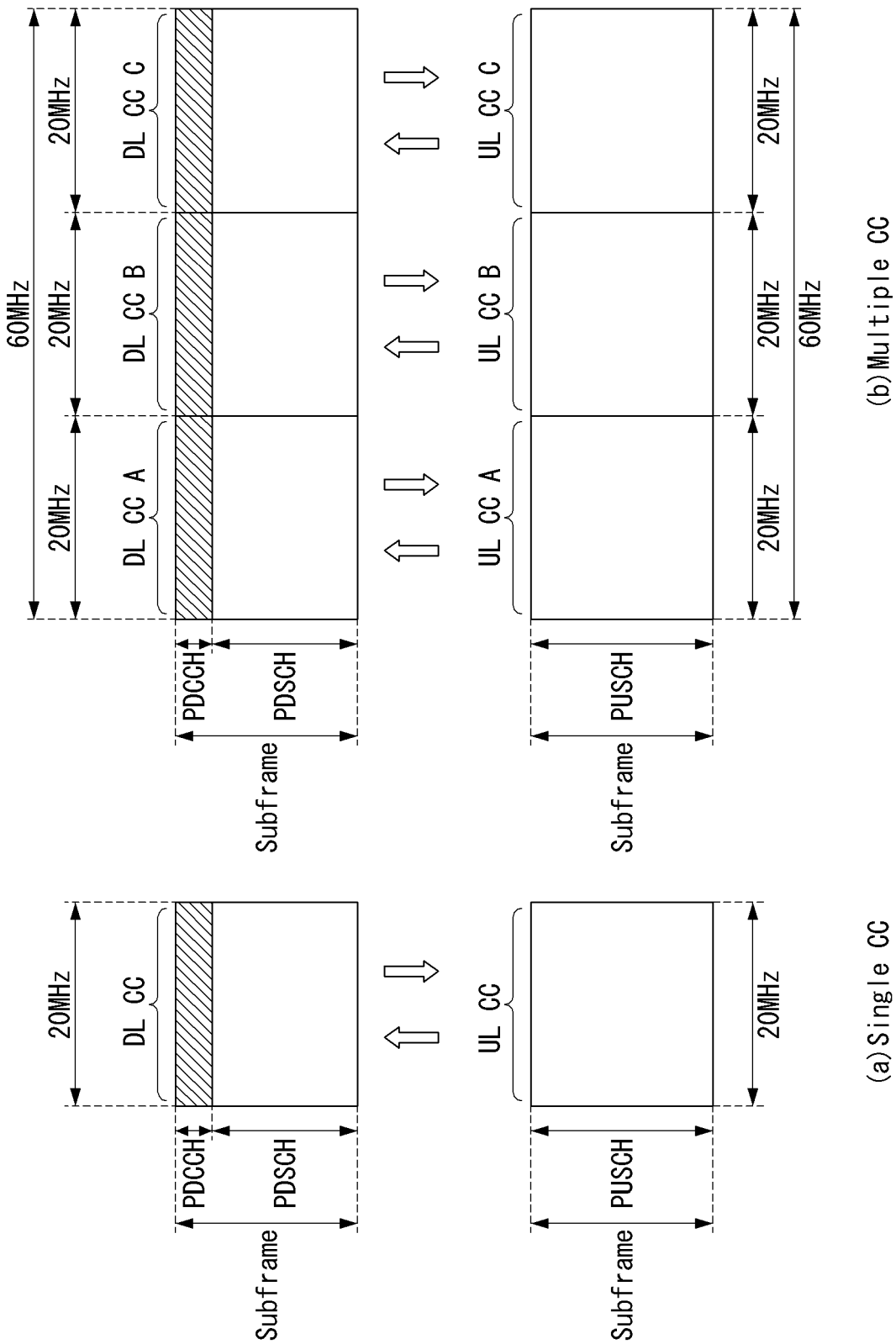
FIG. 5 shows an example of component carriers and carrier aggregations in a wireless communication system to which the present invention may be applied.

FIG. 5 illustrates examples of a component carrier and carrier aggregation in a wireless communication system to which the present invention may be applied.

FIG. 5(a) illustrates a single carrier structure used in the LTE system. The component carrier includes the DL CC and the UL CC. One component carrier may have a frequency range of 20 MHz.

FIG. 5(b) illustrates a carrier aggregation structure used in the LTE-A system. FIG. 12(b) illustrates a case where three component carriers having a frequency magnitude of 20 MHz are combined. There are three DL CCs and three UL CCs, but the numbers of DL CCs and UL CCs are not limited. In the case of the carrier aggregation, the UE may simultaneously monitor three CCs, and receive a downlink signal/data and transmit an uplink signal/data.

When N DL CCs are managed in a specific cell, the network may allocate M (M≤N) DL CCs to the user equipment. In this case, the UE may monitor only M limited DL CCs and receive the DL signal. Further, the network may allocate a primary DL CC to the user equipment by assigning priorities to L (L≤M≤N) DL CCs and in this case, the UE needs to particularly monitor L DL CCs. Such a scheme may be similarly applied even to uplink transmission.

A linkage between the carrier frequency (or DL CC) of the downlink resource and the carrier frequency (or UL CC) of the uplink resource may be indicated by a higher layer message such as an RRC message or system information. For example, a combination of the DL resource and the UL resource may be configured by a linkage defined by System Information Block Type2 (SIB2). Specifically, the linkage may refer to a mapping relationship between a DL CC in which a PDCCH carrying a UL grant is transmitted and a UL CC that uses the UL grant or may refer to a mapping relationship between a DL CC (or UL CC) in which data for HARQ is transmitted and a UL CC (or DL CC) in which an HARQ ACK/NACK signal is transmitted.

Cross Carrier Scheduling

There are two types of a self-scheduling method and a cross carrier scheduling method in terms of scheduling for a carrier (or a carrier wave) or a serving cell in a carrier aggregation system. Cross carrier scheduling may be referred to as cross component carrier scheduling or cross cell scheduling.

The cross carrier scheduling means that the PDCCH (DL Grant) and the PDSCH are transmitted to different DL CCs or the PUSCH transmitted according to the PDCCH (UL Grant) transmitted from the DL CC is transmitted through other UL CC other than UL CC linked with the DL CC receiving the UL grant.

The cross carrier scheduling may be UE-specifically activated or deactivated and may be semi-statically informed for each UE through higher layer signaling (e.g., RRC signaling).

When the cross carrier scheduling is activated, a carrier indicator field (CIF) indicating through which DL/UL CC the PDSCH/PUSCH indicated by the corresponding PDCCH is transmitted to the PDCCH is required. For example, the PDCCH may allocate a PDSCH resource or a PUSCH resource to one of multiple component carriers using the CIF. That is, the CIF is configured when the PDCCH on the DL CC allocates the PDSCH or PUSCH resource to one of DL/UL CC in which is multi-aggregated. In this case, a DCI format of LTE-A Release-8 may be extended according to the CIF. In this case, the configured CIF may be fixed to the 3-bit field or a location of the configured CIF may be fixed regardless of a DCI format size. Further, a PDCCH structure (resource mapping based the same coding and the same CCE) of LTE-A Release-8 may be reused.

On the contrary, the CIF is not configured when the PDCCH on the DL CC allocates the PDSCH resource on the same DL CC or allocates the PUSCH resource on a single linked UL CC. In this case, the same PDCCH structure (resource mapping based the same coding and the same CCE) and the DCI format as LTE-A Release-8 may be used.

When the cross carrier scheduling is available, the UE needs to monitor the PDCCHs for a plurality of DCIs in the control region of the monitoring CC according to the transmission mode and/or bandwidth for each CC. Therefore, the configuration of the search space and PDCCH monitoring that may support the monitoring are needed.

In the carrier aggregation system, a UE DL CC set represents a set of DL CCs scheduled for the UE to receive the PDSCH and a UE UL CC set represents a set of UL CCs scheduled for the UE to transmit the PUSCH. Further, a PDCCH monitoring set indicates at least one DL CC set that performs PDCCH monitoring. The PDCCH monitoring set may be the same as the UE DL CC set or may be a subset of the UE DL CC set. The PDCCH monitoring set may include at least any one of DL CCs within the UE DL CC set. Alternatively, the PDCCH monitoring set may be separately defined regardless of the UE DL CC set. The DL CC included in the PDCCH monitoring set may be configured so that the self-scheduling for the linked UL CC is continuously enabled. The UE DL CC set, the UE UL CC set, and the PDCCH monitoring set may be configured to be UE-specific, UE group-specific, or cell-specific.

When the cross carrier scheduling is deactivated, it is meant that the PDCCH monitoring set is continuously the same as the UE DL CC set and in this case, an indication such as separate signaling for the PDCCH monitoring set is not required. However, when the cross carrier scheduling is activated, the PDCCH monitoring set is preferably defined within the UE DL CC set. That is, in order to schedule the PDSCH or PUSCH with respect to the UE, the eNB transmits the PDCCH through only the PDCCH monitoring set.

Figure 6:
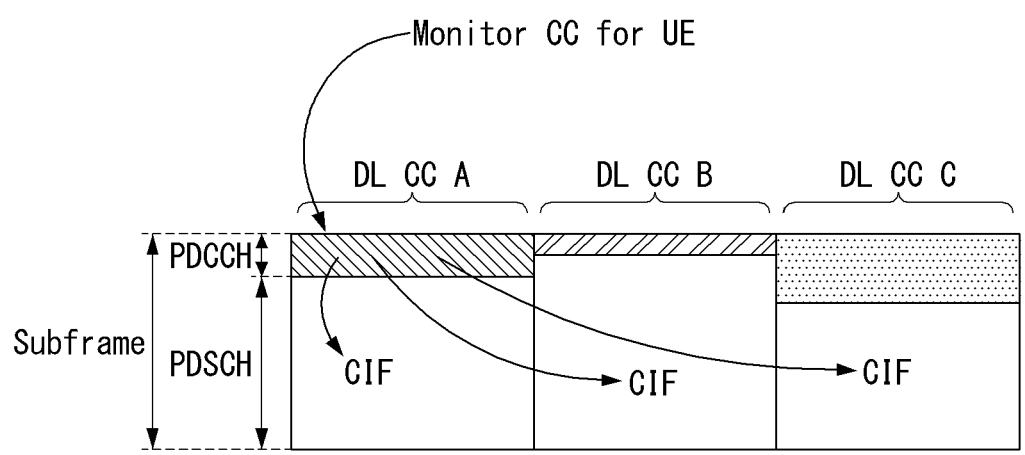
FIG. 6 shows an example of a subframe structure according to cross-carrier scheduling in a wireless communication system to which the present invention may be applied.

FIG. 6, illustrates an example of a subframe structure according to cross carrier scheduling in a wireless communication system to which the present invention may be applied.

Referring to FIG. 6, a DL subframe for the LTE-A UE is combined with three DL CCs and DL CC 'A' is configured as PDCCH monitoring DL CC. When CIF is not used, each DL CC may transmit a PDCCH that schedules the PDSCH of the DL CC without the CIF. On the contrary, when the CIF is used through the higher layer signaling, only one DL CC 'A' may transmit the PDCCH that schedules the PDSCH of DL CC 'A' or the PDSCH of another CC. In this case, DL CCs 'B' and 'C' which are not configured as PDCCH monitoring DL CC do not transmit the PDCCH.

Reference Signal (RS)

In a wireless communication system, a signal may be distorted during transmission because data is transmitted through a wireless channel. In order for a reception stage to precisely receive a distorted signal, the distortion of the received signal must be corrected using channel information. In order to detect the channel information, a signal transmission method known to both the transmission side and the reception side and a method of detecting channel information using the degree that the signal has been distorted when the signal is transmitted through the channel are chiefly used. The above-described signal is called a pilot signal or a reference signal (RS).

Furthermore, when a packet is transmitted in most of recent mobile communication systems, a method capable of improving transmission and reception data efficiency by adopting multiple transmission antennas and multiple reception antennas instead of using a single transmission antenna and a single reception antenna so far is used. When data is transmitted and received using multiple input/output antennas, a channel state between a transmission antenna and a reception antenna needs to be detected to accurately receive a signal. Accordingly, each transmission antenna must have an individual reference signal.

In a mobile communication system, an RS may be basically divided into two types depending on its object. The RS includes an RS of an object for channel information acquisition and an RS used for data demodulation. The former needs to be transmitted in a wide band because a UE has an object of obtaining channel information in downlink, and even a UE that does not receive downlink data in a specific subframe must be able to receive and measure the corresponding RS. Furthermore, this RS is also used for measurement, such as handover. The latter is an RS transmitted along with a corresponding resource when a base station transmits downlink, and a UE may perform channel estimation by receiving the corresponding RS, being capable of demodulating data. This RS needs to be transmitted in the region in which data is transmitted.

Five types of downlink reference signals are defined.
Cell-specific reference signal (CRS)
Multicast-broadcast single-frequency network reference signal (MBSFN RS)
UE-specific reference signal or a demodulation reference signal (DM-RS)
Positioning reference signal (PRS)
Channel state information reference signal (CSI-RS)
One reference signal is transmitted in each downlink antenna port.

A CRS is transmitted in all downlink subframes within a cell supporting PDSCH transmission. The CRS is transmitted in one or more of the antenna ports 0-3. The CRS is defined only in Δf=15 kHz.

An MBSFN RS is transmitted in the MBSFN region of an MBSFN subframe only when a physical multicast channel (PMCH) is transmitted. The MBSFN RS is transmitted in the antenna port 4. The MBSFN RS is defined only in an extended CP.

A DM-RS is supported for the transmission of a PDSCH, and is transmitted in the antenna port p=5, p=7, p=8 or p=7, 8, . . . , ν+6. In this case, υ is the number of layers used for PDSCH transmission. The DM-RS is present and valid for PDSCH demodulation only when PDSCH transmission is associated with a corresponding antenna port. The DM-RS is transmitted only in a resource block (RB) to which a corresponding PDSCH is mapped.

If any one of a physical channel or a physical signal in addition to a DM-RS regardless of an antenna port (p) is transmitted using the RE of the same index pair (k,l) as a resource element (RE) in which the DM-RS is transmitted, the DM-RS is not transmitted in the RE of the corresponding index pair (k,l).

A PRS is transmitted only in a resource block within a downlink subframe configured for PRS transmission.

If both a normal subframe and an MBSFN subframe are configured as positioning subframes within one cell, OFDM symbols within the MBSFN subframe configured for PRS transmission use the same CP as that of a subframe #0. If only an MBSFN subframe is configured as a positioning subframe within one cell, OFDM symbols configured for a PRS within the MB SFN region of the corresponding subframe use an extended CP.

The starting point of an OFDM symbol configured for PRS transmission is the same as the starting point of a subframe in which all OFDM symbols have the same CP length as an OFDM symbol configured for PRS transmission within a subframe configured for the PRS transmission.

A PRS is transmitted in the antenna port 6.

A PRS is not mapped to an RE (k,l) allocated to a physical broadcast channel (PBCH), a PSS or an SSS regardless of an antenna port (p).

A PRS is defined only in Δf=15 kHz.

A CSI-RS is transmitted in the antenna port 1, 2, 4 or 8 using p=15, p=15,16, p=15, . . . , 18 and p=15, . . . , 22, respectively.

A CSI-RS is defined only in Δf=15 kHz.

A reference signal is described more specifically.

A CRS is a reference signal for the acquisition of information about a channel state shared by all UEs within a cell and for measurement, such as handover. A DM-RS is used for data demodulation for only a specific UE. Information for demodulation and channel measurement may be provided using such reference signals. That is, the DM-RS is used for data demodulation only, and the CRS is used for the two objects of channel information acquisition and data demodulation.

The reception side (i.e., UE) measures a channel state from a CRS, and feeds an indicator related to channel quality, such as a channel quality indicator (CQI), a precoding matrix index (PMI) and/or a rank indicator (RI), back to the transmission side (i.e., base station). The CRS is also called a cell-specific reference signal (RS). In contrast, a reference signal related to the feedback of channel state information (CSI) may be defined as a CSI-RS.

A DRS may be transmitted through resource elements when data demodulation on a PDSCH is necessary. A UE may receive whether a DRS is present through an upper layer, and is valid only when a corresponding PDSCH has been mapped. The DRS may be called a UE-specific reference signal (RS) or a demodulation reference signal (DMRS).

Figure 7:
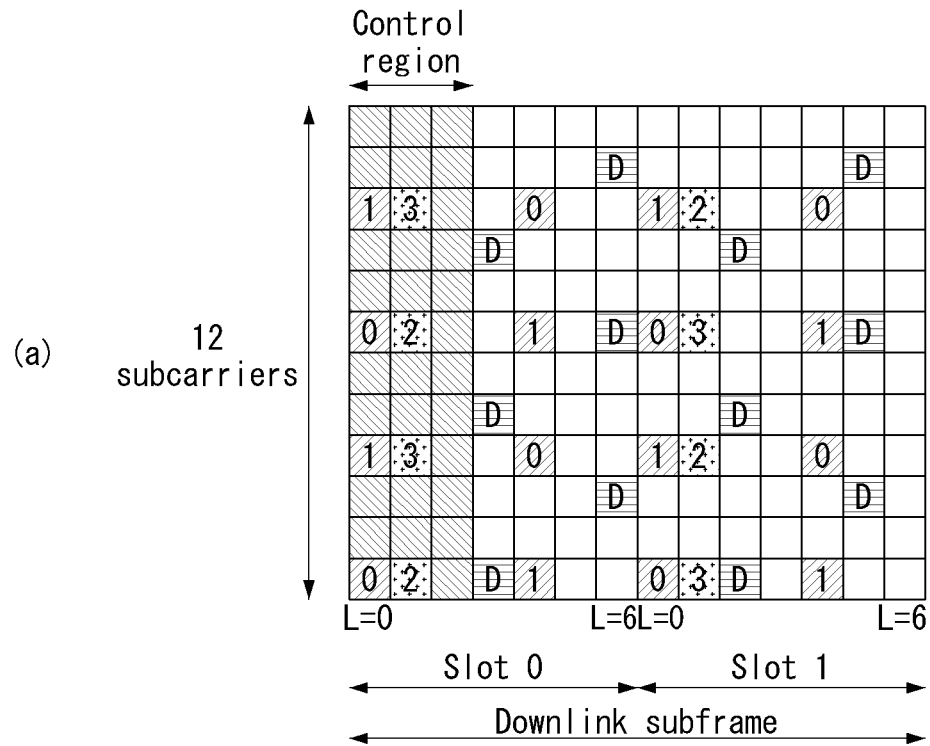
FIG. 7 illustrates reference signal patterns mapped to downlink resource block pairs in a wireless communication system to which the present invention may be applied.
Figure 7:
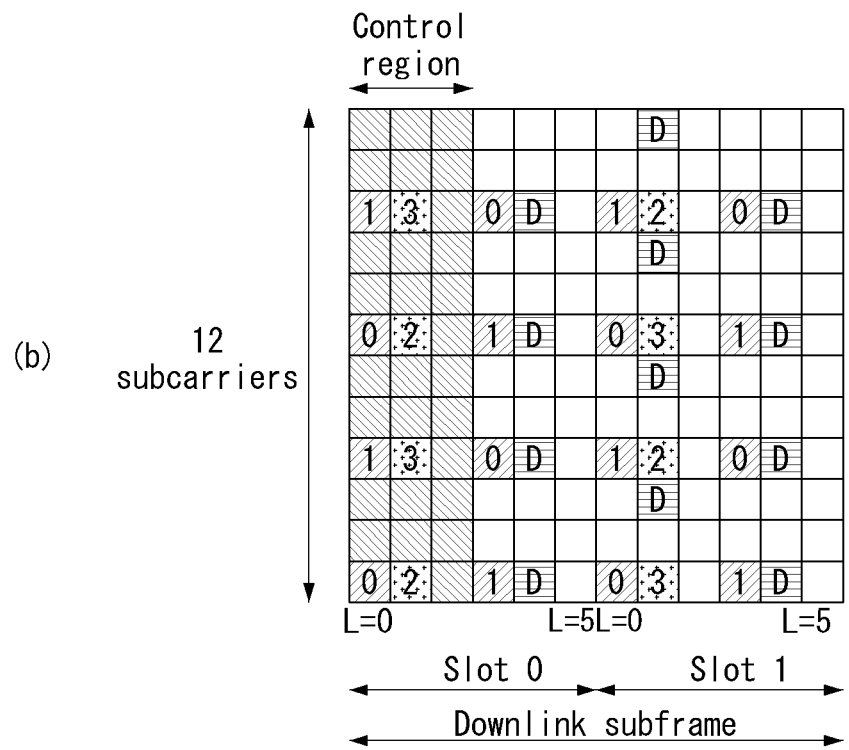

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented as one subframe in the frequency domain×12 subcarriers in the time domain. That is, one resource block pair on a time axis (x axis) has the length of 14 OFDM symbols in the case of a normal cyclic prefix (normal CP) (in the case of FIG. 7(a)), and has the length of 12 OFDM symbols in the case of an extended cyclic prefix (extended CP) (in the case of FIG. 7(b)). In the resource block lattice, resource elements (REs) written as "0", "1", "2" and "3" mean locations of the CRSs of antenna port indices "0", "1", "2" and "3", respectively. Resource elements written as "D" mean locations of DRSs.

Hereinafter, a CRS is described more specifically. A CRS is used to estimate the channel of a physical antenna and is distributed to a full frequency band as a reference signal that may be received in common by all UEs disposed within a cell. Furthermore, the CRS may be used for channel quality information (CSI) and data demodulation.

A CRS is defined in various formats depending on an antenna array on the transmission side (base station). The 3GPP LTE system (e.g., Release-8) supports various antenna arrays. A downlink signal transmission side has three types of antenna arrays, such as three single-transmission antennas, two transmission antennas and four transmission antennas. If a base station uses a single transmission antenna, reference signals for a single antenna port is arrayed. If a base station uses two transmission antennas, reference signals for two transmission antenna ports are arrayed using a time division multiplexing (TDM) scheme and/or a frequency division multiplexing (FDM) scheme. That is, different time resources and/or different frequency resources are allocated so that the reference signals for the two antenna ports are distinguished.

Furthermore, if a base station uses four transmission antennas, reference signals for four transmission antenna ports are arrayed using the TDM scheme and/or the FDM scheme. Channel information measured by the reception side (UE) of a downlink signal may be used to demodulate transmitted data using a transmission method, such as single transmission antenna transmission, transmit diversity, closed-loop spatial multiplexing, open-loop spatial multiplexing or multi-user multiple input/output (MIMO) antennas.

If multiple input/output antennas are supported, when a reference signal is transmitted from a specific antenna port, the reference signal is transmitted at the location of specific resource elements based on the pattern of the reference signal, and is not transmitted at the location of specific resource elements for another antenna port. That is, reference signals between different antennas do not overlap.

A rule in which a CRS is mapped to a resource block is defined as follows.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 1, k and l indicate a subcarrier index and a symbol index, respectively. p indicates an antenna port. N_symb^DL indicates the number of OFDM symbols in one downlink slot. N_RB^DL indicates the number of wireless resources allocated to downlink. n_s indicates a slot index, and N_ID^cell indicates a cell ID. mod indicates modulo operation. The location of a reference signal is different depending on a v_shift value in the frequency domain. v_shift depends on a cell ID (i.e., physical cell identity), and thus the location of a reference signal has various frequency shift values depending a cell.

More specifically, in order to improve channel estimation performance through a CRS, the location of a CRS may be shifted in the frequency domain depending on a cell. For example, if a reference signal is located at intervals of 3 subcarriers, reference signals in one cell are allocated to a (3k)-th subcarrier and reference signals in another cell are allocated to a (3k+1)-th subcarrier. From the viewpoint of one antenna port, reference signals are arrayed at intervals of 6 resource elements in the frequency domain and are separated at intervals of 3 resource elements from reference signals allocated to another antenna port.

In the time domain, a reference signal starts from the symbol index 0 of each slot and is arrayed at a constant interval. A time interval is differently defined depending on a cyclic prefix length. In the case of a normal cyclic prefix, a reference signal is located at the symbol indices 0 and 4 of a slot. In the case of an extended cyclic prefix, a reference signal is located at the symbol indices 0 and 3 of a slot. A reference signal for an antenna port having a maximum value among two antenna ports is defined within one OFDM symbol. Accordingly, in the case of four-transmission antenna transmission, a reference signal for reference signal antenna ports 0 and 1 is located at the symbol indices 0 and 4 of a slot (symbol indices 0 and 3 in the case of an extended cyclic prefix), and a reference signal for the antenna ports 2 and 3 is located at the symbol index 1 of a slot. The locations of reference signals for the antenna ports 2 and 3 in the frequency domain are exchanged in the second slot.

Hereinafter, a DRS is described more specifically. A DRS is used to demodulate data. In multiple input/output antenna transmission, a precoding weight used for a specific UE is associated with a transmission channel transmitted in each transmission antenna when a UE receives a reference signal, and is used without any change in order to estimate the corresponding channel.

A 3GPP LTE system (e.g., Release-8) supports a maximum of 4 transmission antennas, and a DRS for rank 1 beamforming is defined in the 3GPP LTE system. The DRS for rank 1 beamforming also indicates a reference signal for the antenna port index 5.

A rule in which a DRS is mapped to a resource block is defined as follows. Equation 2 shows the case of a normal cyclic prefix, and Equation 3 shows the case of an extended cyclic prefix.

$$k = (k') \bmod N_{sc}^{RB} + N_{sc}^{RB} \cdot n_{PRB} \quad \text{[Equation 2]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

-continued $$k = (k') \bmod N_{sc}^{RB} + N_{sc}^{RB} \cdot n_{PRB} \quad \text{[Equation 3]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 2 and 3, k and 1 indicate a subcarrier index and a symbol index, respectively. p indicates an antenna port. N_sc^RB indicates a resource block size in the frequency domain and is represented as the number of subcarriers. n_PRB indicates the number of physical resource blocks. N_RB^PDSCH indicates the frequency band of a resource block for PDSCH transmission. n_s indicates a slot index. N_ID^cell indicates a cell ID (i.e., physical cell identity). mod indicates modulo operation. The location of a reference signal is different based on a v_shift value in the frequency domain. Since v_shift depends on a cell ID (i.e., physical cell identity), the location of a reference signal has various frequency shift values depending on a cell.

In Equation 1 to Equation 3, k and p indicate a subcarrier index and an antenna port, respectively. N_RB^DL, ns, and N_ID^Cell indicate the number of RBs allocated to downlink, the number of slot indices, and the number of cell IDs, respectively. The location of an RS is different based on a v_shift value in the frequency domain viewpoint.

Coordinated Multi-Point Transmission and Reception (CoMP)

In line with the needs of LTE-advanced, CoMP transmission was proposed for the performance improvement of a system. CoMP is also called co-MIMO, collaborative MIMO, network MIMO, etc. CoMP is expected to enhance performance of a UE located at a cell boundary and to enhance an average throughput of cells (sectors).

In general, inter-cell interference degrades performance of a UE located at a cell boundary and average cell (sector) efficiency in a multi-cell environment in which a frequency reuse index is 1. In order to reduce inter-cell interference, a simple passive method, such as fractional frequency reuse (FFR), has been applied in the LTE system so that a UE located at a cell boundary has proper performance efficiency in an interference-limited environment. However, a method of reusing inter-cell interference or reducing inter-cell interference as a signal desired by a UE instead of reducing the use of a frequency resource per cell is more profitable. In order to achieve the above-described object, a CoMP transmission method may be applied.

A CoMP method which may be applied to downlink may be divided into a joint processing (JP) method and a coordinated scheduling/beamforming (CS/CB) method.

In the JP method, data may be used at each point (base station) of a CoMP unit. The CoMP unit means a set of base stations used for the CoMP method. The JP method may be subdivided into a joint transmission method and a dynamic cell selection method.

The joint transmission method means a method of transmitting signals through a PDSCH from a plurality of points, that is, all or some in a CoMP unit. That is, data transmitted to a single UE may be transmitted from a plurality of transmission points at the same. Quality of a signal transmitted to a UE can be enhanced regardless of a coherent manner to a non-coherent manner through such a joint transmission method, and interference with another UE can be actively removed.

The dynamic cell selection method means a method of transmitting a signal from a single point through a PDSCH in a CoMP unit. That is, data transmitted to a single UE in a specific time is transmitted from a single point, and data is not transmitted to a UE at another point within a CoMP unit. A point where data is transmitted to a UE may be dynamically selected.

In accordance with the CS/CB method, a CoMP unit performs beamforming in cooperation for data transmission to a single UE. That is, only a serving cell transmits data to a UE, but user scheduling/beamforming may be determined through cooperation between a plurality of cells within the CoMP unit.

In the case of uplink, CoMP reception means that a transmitted signal is received through cooperation between a plurality of geographically separated points. A CoMP method which may be applied to the uplink may be divided into a joint reception (JR) method and a coordinated scheduling/beamforming (CS/CB) method.

The JR method means a method for a plurality of points, that is, all or some in a CoMP unit, to receive a transmitted signal through a PDSCH. In the CS/CB method, only a single point receives a transmitted signal through a PDSCH, but user scheduling/beamforming may be determined through cooperation between a plurality of cells within a CoMP unit.

CA-Based CoMP Operation

In post-LTE systems, cooperative multi-point (CoMP) transmission may be implemented using a carrier aggregation (CA) function in LTE.

Figure 8:
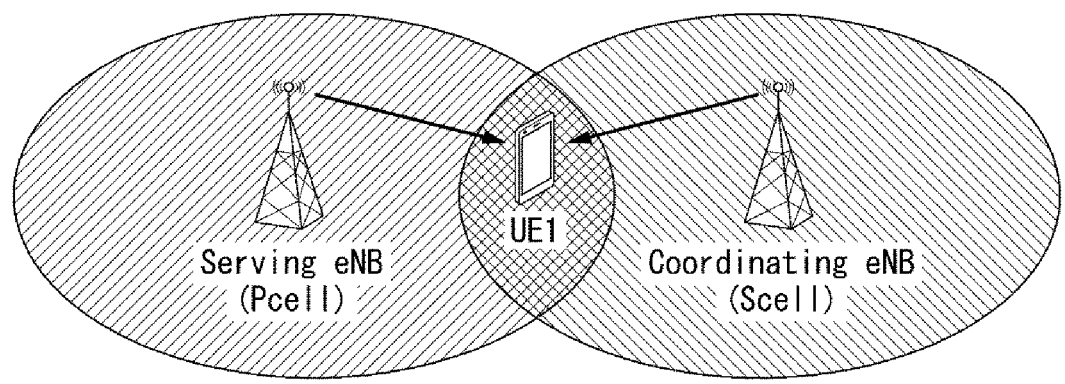
FIG. 8 is a diagram illustrating a carrier aggregation-based CoMP system in a wireless communication system to which the present invention may be applied.
Figure 8:
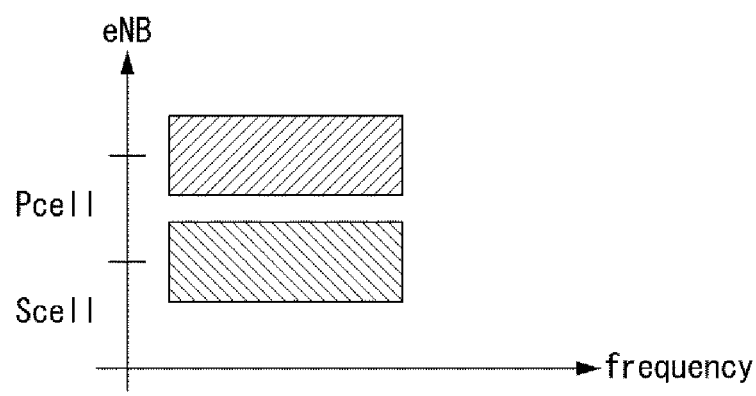

FIG. 8 is a diagram illustrating a carrier aggregation-based CoMP system in a wireless communication system to which the present invention may be applied.

FIG. 8 illustrates a case where a primary cell (PCell) carrier and a secondary cell (SCell) carrier use the same frequency band in a frequency axis and are allocated two eNBs that are geographically separated.

A serving eNB may allocate a PCell to a UE1 and an adjacent eNB giving much interference may allocate an SCell, thereby enabling various DL/UL CoMP operations, such as JT, CS/CB, and dynamic cell selection.

FIG. 8 shows an example in which the UE merges the two eNBs into a PCell and an SCell, respectively. Practically, one UE may merge 3 cells or more, and some of the cells may perform a CoMP operation in the same frequency band and other cells may perform a simple CA operation in a different frequency band. In this case, a PCell does not essentially participate in the CoMP operation.

PDCCH Transmission

An eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for a specific UE. Alternatively, in the case of the PDCCH for the paging message, the CRC may be masked with a paging indication identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

Next, the eNB generates coded data by performing channel coding of control information to which the CRC is added. In this case, the channel coding may be performed with a code rate depending on an MCS level. The eNB performs rate matching depending on a CCE aggregation level allocated to the PDCCH format and modulates the coded data to generate modulation symbols. In this case, a modulation sequence depending on the MCS level may be used. In modulation symbols constituting one PDCCH, the CCE aggregation level may be one of 1, 2, 4, and 8. Thereafter, the eNB maps the modulation symbols to a physical resource element (CCE to RE mapping).

A plurality of PDCCH may be transmitted within one subframe. That is, the control region of one subframe is constituted by a plurality of CCEs having indexes 0~N_(CCE, k)−1. In this case, N_(CCE, k) represents the total number of CCEs within the control region of the k-th subframe. The UE monitors a plurality of PDCCHs for every subframe.

In this case, monitoring means that the UE attempts to decode each of the PDCCHs according to monitored PDCCH formats. In the control region allocated in the subframe, the eNB does not provide information on where the corresponding PDCCH is located to the UE. Since the UE may not know from which position and by which CCE aggregation level or DCI format the PDCCH of the UE is transmitted in order to receive the control channel transmitted from the eNB, the UE monitors an aggregation of PDCCH candidates in the subframe to find the PDCCH thereof. This is called blind decoding (BD). The blind decoding refers to a method in which the UE de-masks a UE ID of the UE to a CRC part and then checks CRC errors to determine whether the corresponding PDCCH is the control channel of the UE.

In an active mode, the UE monitors the PDCCH of each subframe in order to receive data to be transmitted to the UE. In a DRX mode, the UE wakes up in a monitoring period of every DRX cycle and monitors the PDCCH in a subframe corresponding to the monitoring period. A subframe in which the PDCCH is monitored is referred to as a non-DRX subframe.

In order to receive the PDCCH transmitted to the UE, the UE must perform the blind decoding on all CCEs present in the control region of the non-DRX subframe. Since the UE does not know which PDCCH format is to be transmitted, the UE must decode all PDCCHs at an available CCE aggregation level until the blinding decoding of the PDCCH is successful within every non-DRX subframe. Since the UE does not know how many CCEs the PDCCH for the UE uses, the UE must attempt detection at all available CCE aggregation levels until the blind decoding of the PDCCH is successful. That is, the UE performs the blind decoding for each CCE aggregation level. That is, the UE first attempts decoding by setting a CCE aggregation level unit to 1. When decoding is unsuccessful, the UE attempts decoding by setting the CCE aggregation level unit to 2. Thereafter, the UE attempts decoding by setting the CCE aggregation level unit to 4 and setting the CCE aggregation level unit to 8 again. Further, the UE attempts the blind decoding for all of four indicators C-RNTI, P-RNTI, SI-RNTI, and RA-RNTI. In addition, the UE attempts the blind decoding for all DCI formats to be monitored.

As described above, when the blind decoding is performed for each of all CCE aggregation levels for all DCI formats to be monitored for all available RNTIs, since the number of detection attempts is excessively increased, a search space (SS) concept is defined for the blind decoding of the UE in the LTE system. The search space may mean a PDCCH candidate set for monitoring and may have a different size according to each PDCCH format.

The search space may be constituted by a common search space (CSS) and a UE-specific/dedicated search space (USS). In the case of the common search space, all UEs may know the size of the common search space, but the UE-specific search space may be set individually for each UE. Therefore, the UE must monitor both the UE-specific search space and the common search space in order to decode the PDCCH, and thus performs the blind decoding (BD) at a maximum of 44 times in one subframe. 44-time blind decoding does not include blind decoding performed according to different CRC values (e.g., C-RNTI, P-RNTI, SI-RNTI, and RA-RNTI).

Due to a small search space, in the eNB, a CCE resource for transmitting the PDCCH to all UEs which the eNB intends to transmit the PDCCH within a given subframe may not be secured. The reason is that resources which remain after CCE locations are allocated may not be included in the UE-specific search space. A UE-specific hopping sequence may be applied at a start point of the UE-specific search space in order to minimize such barriers that may continue even in a next subframe.

Table 3 shows sizes of the common search space and the UE-specific search space.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a computational load of the UE according to the number of attempts of blind decoding, the UE does not simultaneously perform searches according to all defined DCI formats. Specifically, the UE may continuously perform searches for DCI formats 0 and 1A in the UE-specific search space. In this case, the DCI formats 0 and 1A have the same size, but the UE may distinguish the DCI format using a flag (flag for format 0/format 1A differentiation) used for distinguishing the DCI formats 0 and 1A included in the PDCCH. In addition, according to the PDSCH transmission mode configured by the eNB, other DCI formats other than formats 0 and 1A may be requested to the UE and as an example, the DCI formats may include DCI formats 1, 1B, and 2.

In the common search space, the UE may search DCI formats 1A and 1C. Further, the UE may be configured to search DCI format 3 or 3A and DCI formats 3 and 3A may have the same size as DCI formats 0 and 1A, but the UE may distinguish the DCI format by using CRC scrambled by other identifiers other than the UE-specific identifier.

The search space $S\_k^{\wedge}(L)$ means a PDCCH candidate set according to the aggregation level $L \in \{1,2,4,8\}$. The CCE according to the PDCCH candidate set m of the search space may be determined by Equation 4 below.

$$L \cdot \{(Y_k+m) \bmod \lfloor N_{CCE,k}/L \rfloor\}+i \quad \text{[Equation 4]}$$

In this case, M_(L) denotes the number of PDCCH candidates according to the CCE aggregation level L for monitoring in the search space and m=0~M^(L)−1. i denotes an index for designating individual CCEs in respective PDCCH candidates and i=0~L−1.

As described above, the UE monitors both the UE-specific search space and the common search space in order to decode the PDCCH. In this case, the common search space CSS supports PDCCHs having aggregate levels of {4, 8} and the UE-specific search space USS supports PDCCHs having aggregate levels of {1, 2, 4, 8}.

Table 4 shows the PDCCH candidates monitored by the UE.

TABLE 4

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 4, for the common search spaces, Y_k is set to 0 for the two aggregation levels L=4 and L=8. For the UE-specific search space for the aggregation level L, Y_k is defined by Equation 5.

$$Y_k = (A \cdot Y_{k-1}) \bmod D \quad \text{[Equation 5]}$$

In this case, $Y_{-1} = n_{RNTI} \neq 0$ and an RNTI value used for n_RNTI may be defined as one of identifications of the UE. Further, A=39827, D=65537, and $k = \lfloor n_s/2 \rfloor$. In this case, n_s denotes is the slot number (or index) within a radio frame UE Procedure for Receiving PDSCH Except the subframes indicated by the higher layer parameter 'mbsfn-SubframeConfigList', a UE shall upon detection of a PDCCH of a serving cell with DCI format 1, 1A, 1B, 1C, 1D, 2, 2A, 2B or 2C intended for the UE in a subframe, decode the corresponding PDSCH in the same subframe with the restriction of the number of transport blocks defined in the higher layers.

A UE may assume that positioning reference signals are not present in resource blocks in which it shall decode PDSCH according to a detected PDCCH with CRC scrambled by the SI-RNTI or P-RNTI with DCI format 1A or 1C intended for the UE.

A UE configured with the carrier indicator field for a given serving cell shall assume that the carrier indicator field is not present in any PDCCH of the serving cell in the common search space.

Otherwise, the CIF-configured UE shall assume that for the CIF for the serving cell is present in PDCCH located in the UE specific search space when the PDCCH CRC is scrambled by C-RNTI or SPS C-RNTI.

If a UE is configured by higher layers to decode PDCCH with CRC scrambled by the SI-RNTI, the UE decodes the PDCCH and the corresponding PDSCH according to any of the combinations defined in Table 5 below. The scrambling initialization of PDSCH corresponding to these PDCCHs is by SI-RNTI.

Table 5 illustrates a PDCCH and a PDSCH configured by SI-RNTI.

TABLE 5

| DCI format | DCI format | transmission scheme of PDSCH corresponding to PDCCH |
|---|---|---|
| DCI format 1C | Common | If the number of PBCH antenna ports is 1, Single-antenna port, port 0 is used, otherwise Transmit diversity. |
| DCI format 1A | Common | If the number of PBCH antenna ports is 1, Single-antenna port, port 0 is used, otherwise Transmit diversity |

If a UE is configured by higher layers to decode PDCCH with CRC scrambled by P-RNTI, the UE decodes the PDCCH and the corresponding PDSCH according to any of the combinations defined in Table 6 below. The scrambling initialization of PDSCH corresponding to these PDCCHs is by P-RNTI.

Table 6 illustrates a PDCCH and a PDSCH configured by P-RNTI.

TABLE 6

| DCI format | Search space | transmission scheme of PDSCH corresponding to PDCCH |
|---|---|---|
| DCI format 1C | Common | If the number of PBCH antenna ports is 1, Single-antenna port, port 0 is used, otherwise Transmit diversity |
| DCI format 1A | Common | If the number of PBCH antenna ports is 1, Single-antenna port, port 0 is used, otherwise Transmit diversity |

If a UE is configured by higher layers to decode PDCCH with CRC scrambled by RA-RNTI, the UE decodes the PDCCH and the corresponding PDSCH according to any of the combinations defined in Table 7 below. The scrambling initialization of PDSCH corresponding to these PDCCHs is by RA-RNTI.

Table 7 illustrates a PDCCH and a PDSCH configured by RA-RNTI.

TABLE 7

| DCI format | Search space | transmission scheme of PDSCH corresponding to PDCCH |
|---|---|---|
| DCI format 1C | Common | If the number of PBCH antenna ports is 1, Single-antenna port, port 0 is used, otherwise Transmit diversity |
| DCI format 1A | Common | If the number of PBCH antenna ports is 1, Single-antenna port, port 0 is used, otherwise Transmit diversity |

The UE may be semi-statically configured via higher layer signaling to receive PDSCH data transmissions signaled via the PDCCH according to one of nine transmission modes, denoted mode 1 to mode 9.

In the case of a frame structure type 1,
  The UE does not receive PDSCH RBs transmitted on antenna port 5 even in any subframe in which the number of OFDM symbols for PDCCH with normal CP is equal to four.
  The UE does not receive PDSCH RBs transmitted on antenna port 5, 7, 8, 9, 10, 11, 12, 13 or 14 in the two PRBs to which a pair of virtual RBs (VRBs) is mapped if either one of the two physical RBs (PRBs) overlaps in frequency with a transmission of either PBCH or primary or secondary synchronization signals in the same subframe.

The UE does not receive PDSCH RBs transmitted on antenna port 7 for which distributed VRB resource allocation is assigned.

The UE may skip decoding the transport blocks if it does not receive all assigned PDSCH RBs. If the UE skips decoding, the physical layer indicates to higher layer that the transport blocks are not successfully decoded.

In the case of a frame structure type 2,

The UE does not receive PDSCH RBs transmitted on antenna port 5 even in any subframe in which the number of OFDM symbols for PDCCH with normal CP is equal to four.

The UE does not receive PDSCH RBs transmitted on antenna port 5 in the corresponding two PRBs to which a pair of VRBs is mapped if either one of the two PRBs overlaps in frequency with a transmission of PBCH in the same subframe.

The UE does not receive PDSCH RBs transmitted on antenna 7, 8, 9, 10, 11, 12, 13 or 14 in the two PRBs to which a pair of VRBs is mapped if either one of the two PRBs overlaps in frequency with a transmission of a primary or secondary synchronization signal in the same subframe.

When the normal CP is configured, the UE does not receive a PDSCH on antenna port 5 for which distributed VRB resource allocation is assigned in the special subframe with uplink-downlink configuration #1 or #6.

The UE does not receive a PDSCH on antenna port 7 for which distributed VRB resource allocation is assigned.

The UE may skip decoding the transport block if it does not receive all assigned PDSCH RBs. If the UE skips decoding, the physical layer indicates to higher layer that the transport blocks are not successfully decoded.

If a UE is configured by higher layers to decode a PDCCH with CRC scrambled by C-RNTI, the UE decodes the PDCCH and the corresponding PDSCH according to any of the combinations defined in Table 10 below. The scrambling initialization of PDSCH corresponding to these PDCCHs is by C-RNTI.

If the UE is configured with the CIF for a serving cell or, if the UE is configured by higher layers to decode a PDCCH with CRC scrambled by the C-RNTI, the UE decodes a PDSCH of the serving cell indicated by the CIF value in the decoded PDCCH.

When the UE configured in the transmission mode 3, 4, 8 or 9 receives a DCI format 1A assignment, the UE assumes that the PDSCH transmission is associated with transport block 1 and that transport block 2 is disabled.

When the UE is configured in the transmission mode 7, scrambling initialization of UE-specific reference signals corresponding to these PDCCHs is by C-RNTI.

The UE does not support the transmission mode 8 if extended CP is used in the downlink.

When the UE is configured in the transmission mode 9, if the UE detects a PDCCH with CRC scrambled by the C-RNTI transmitting DCI format 1A or 2C intended for the UE, decode the corresponding PDSCH in the same subframe, the UE decodes the corresponding PDSCH in a subframe indicated by a higher layer parameter 'mbsfn-SubframeConfigList'. However, the UE is configured to decode a PMCH by the higher layer or the PRS occasion is configured only in an MBSFN subframe, the CP length used in subframe #0 is normal CP, and the subframe configured by a part of the PRS occasion by the higher layer is excepted.

Table 8 illustrates a PDCCH and a PDSCH configured by C-RNTI.

TABLE 8

| Transmission mode | DCI format | Search space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1 | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is 1, single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is 1, single-antenna port, port 0 is used, otherwise Transmit diversity |
|  | DCI format 2B | UE specific by C-RNTI | Dual layer transmission, port 7 and 8 or single-antenna port, port 7 or 8 |

TABLE 8-continued

| Transmission mode | DCI format | Search space | Transmission scheme of PDSCH corresponding to PDCCH |
|---|---|---|---|
| Mode 9 | DCI format 1A | Common and UE specific by C-RNTI | Non-MBSFN subframe: If the number of PBCH antenna ports is 1, single-antenna port, port 0 is used, otherwise Transmit diversity MBSFN subframe: Single-antenna port, port 7 |
| | DCI format 2C | UE specific by C-RNTI | Up to 8 layer transmission, ports 7-14 |

If a UE is configured by higher layers to decode a PDCCH with CRC scrambled by SPS C-RNTI, the UE decodes the PDCCH on the primary cell and any corresponding PDSCH on the primary cell according to any of the combinations defined in Table 9 below. The same PDSCH related configuration is applied in the case that a PDSCH is transmitted without a corresponding PDCCH. The scrambling initialization of a PDSCH corresponding to these PDCCHs and a PDSCH without a corresponding PDCCH is by SPS C-RNTI.

When the UE is configured in the transmission mode 7, scrambling initialization of UE-specific reference signals corresponding to these PDCCH(s) is by SPS C-RNTI.

When the UE is configured in the transmission mode 9, if the UE detects a PDCCH with CRC scrambled by the SPS C-RNTI transmitting DCI format 1A or 2C intended for the UE or a PDSCH configured without the PDCCH intended for the UE, the UE decodes the corresponding PDSCH in a subframe indicated by a higher layer parameter 'mbsfn-SubframeConfigList'. However, the UE is configured to decode a PMCH by the higher layer or the PRS occasion is configured only in an MBSFN subframe, the CP length used in subframe #0 is normal CP, and the subframe configured by a part of the PRS occasion by the higher layer is excepted.

Table 9 illustrates a PDCCH and a PDSCH configured by SPS C-RNTI.

If the UE is configured by higher layers to decode a PDCCH with CRC scrambled by a temporary C-RNTI and is not configured to decode the PDCCH with CRC scrambled by the C-RNTI, the UE decodes the PDCCH and the corresponding PDSCH according to the combination defined in Table 10. The scrambling initialization of PDSCH corresponding to these PDCCHs is by temporary C-RNTI.

Table 10 illustrates a PDCCH and a PDSCH configured by temporary C-RNTI.

TABLE 10

| DCI format | Search space | Transmission scheme of PDSCH corresponding to PDCCH |
|---|---|---|
| DCI format 1A | Common and UE specific by temporary C-RNTI | If the number of PBCH antenna ports is 1, single-antenna port, port 0 is used, otherwise Transmit diversity |
| DCI format 1 | UE specific by temporary C-RNTI | If the number of PBCH antenna ports is 1, single-antenna port, port 0 is used, otherwise Transmit diversity |

Reference Signal Transmission and Reception Method for Demodulation of Multicast/broadcast Data The present invention proposes a broadcast and multicast transmission method for a network to transmit the same data

TABLE 9

| Transmission mode | DCI format | Search space | transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Transmit diversity |
| Mode 4 | DCI format 1A | Common and UE specific by C-RNTI | Transmit diversity |
| | DCI format 2 | UE specific by C-RNTI | Transmit diversity |
| Mode 5 | DCI format 1A | Common and UE specific by C-RNTI | Transmit diversity |
| Mode 6 | DCI format 1A | Common and UE specific by C-RNTI | Transmit diversity |
| Mode 7 | DCI format 1A | Common and UE specific by C-RNTI | Single-antenna port, port 5 |
| | DCI format 1 | UE specific by C-RNTI | Single-antenna port, port 5 |
| Mode 8 | DCI format 1A | Common and UE specific by C-RNTI | Single-antenna port, port 7 |
| | DCI format 2B | UE specific by C-RNTI | Single-antenna port, port 7 |
| Mode 9 | DCI format 1A | Common and UE specific by C-RNTI | Single-antenna port, port 7 |
| | DCI format 2C | UE specific by C-RNTI | Single-antenna port, port 7 | to a plurality of UEs through downlink. Furthermore, the present invention also proposes a method capable of effectively coexisting along with unicast transmission in which broadcast and multicast transmission is transmitted to only a single UE.

In this case, broadcast and multicast may appear in a form in which one cell transmits data using a reference signal (RS) and format having a form similar to that of the existing unicast transmission. This may be called a single cell point-to-multipoint (SC-PTM). In the case of SC-PTM transmission, data is transmitted on a PDSCH and a CRS may be used for data demodulation.

Alternatively, broadcast and multicast may appear in a form in which a plurality of cells transmits the same data using a separate RS and format (in particular, an RS and format configured so that signals received from a plurality of cells are properly combined may be preferred) different from those of unicast. This may be called a multicast and broadcast in single frequency network (MB SFN) within a single frequency network. In the case of MB SFN transmission, data may be transmitted only in a subframe designated as an MBSFN subframe, and an MBSFN RS may be used for data demodulation.

Multicast/broadcast is effective in rapidly transmitting data, generated at a specific location, to multiple UEs around the corresponding location.

For example, there is a case where a device installed in a vehicle notifies devices installed in surrounding vehicles of data containing a series of information related to driving (e.g., data providing notification that its vehicle has broken). Such data does not need to be transmitted to a device distant from a device from which the corresponding data has been generated. In contrast, since the data needs to be transmitted to many devices within a given area at once, cells belonging to the corresponding area may preferably broadcast/multicast the data.

In this case, if such information is multicast to devices installed in surrounding vehicles, the information is chiefly transmitted to only a restricted specific area. This means that the number of cells that need to participate in the multicast of the same data has only to be small. In this case, since small base stations (or cells) perform multicast together, delay spread of a composite channel from several base stations (or cells) is relatively small compared to transmission in which many base stations (or cells) participate. Accordingly, there is no problem although the length of a cyclic prefix (CP) for absorbing the delay spread is short.

Accordingly, the present invention proposes a method for a plurality of cells (or base stations) to perform multicast using a CP having a length shorter than a CP length used in the existing MBSFN. In particular, the present invention proposes a method of reusing the structure of a PDSCH used for unicast to a maximum extent in order to reduce the implementation complexity of a UE.

Hereinafter, in the description of the present invention, for convenience of description, a physical layer channel used for a plurality of cells (or base stations) to transmit the same data signal using the structure of a PDSCH is called an enhanced physical multicast channel (ePMCH), but is not limited thereto. A multicast channel used for a plurality of cells (or base stations) to transmit the same data, proposed in the present invention, may be called another name.

In an overall aspect, basically, an ePMCH proposed in the present invention may maintain the shape (or pattern) of an RS used in a PDSCH. Accordingly, there is an advantage in that the channel estimator of the PDSCH can be reused.

Hereinafter, for example, a case where an ePMCH operates based on a CRS is described specifically, for convenience of description.

Hereinafter, in the description of the present invention, it is assumed that a symbol index 1 is sequentially assigned from the first symbol to the last symbol within one subframe, for convenience of description. That is, in the case of a normal CP, since one subframe consists of 14 symbol, symbol indices from 1=0 to 1=13 may be assigned to the 14 symbols, respectively. Furthermore, in the case of an extended CP, since one subframe consists of 12 symbol, symbol indices from 1=0 to 1=11 may be assigned to the symbols, respectively.

An ePMCH may be demodulated using an RS transmitted at the same location (refer to Equation 1) as the existing CRS present in the data region.

The antenna port 0 is described in a normal CP with reference to FIG. 7 again. A CRS is transmitted in a total of 4 symbols within one subframe.

A second RS for an ePMCH may be transmitted in some or all of a total of 4 symbol (i.e., in a normal CP, 1=0, 1=4 symbol in the first and the second slots, respectively, 1 is a symbol index) to which a CRS is mapped within one subframe by considering the above.

For example, a first RS is transmitted from a single cell for a PDCCH for unicast in the first symbol (i.e., 1=0 symbol of the first slot). In contrast, a second RS may be transmitted together from a plurality of cells for an ePMCH in the remaining symbols (i.e., 1=4 symbol of the first slot, 1=0, 1=4 symbol of the second slot).

Accordingly, since the two types of RSs (i.e., first RS and second RS) are substantially different RSs, a UE should not use them for channel estimation.

Furthermore, the two RSs may be different in v-shift (i.e., frequency shift value) or a seed value for generating an RS sequence (e.g., a virtual cell identity (ID)) or the number of antenna ports.

Figure 9:
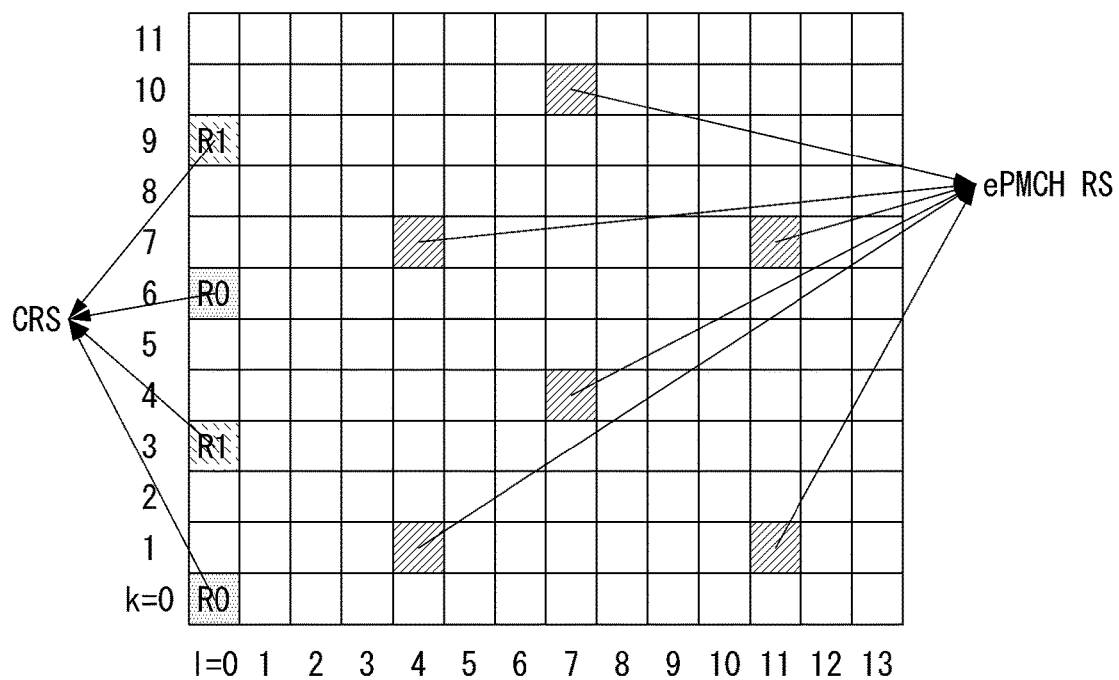
FIG. 9 is a diagram illustrating multicast channel reference signals according to an embodiment of the present invention.

FIG. 9 is a diagram illustrating multicast channel reference signals according to an embodiment of the present invention.

FIG. 9 illustrates a case where a CRS, that is, a first RS, is mapped in an 1=0 symbol and an ePMCH RS, that is, a second RS, is mapped in 1=4, 1=7 and 1=11 symbols.

Furthermore, FIG. 9 shows an example in which the CRS and the ePMCH RS have different v-shifts.

FIG. 9 illustrates a case where the CRS is transmitted through two antenna ports and v-shift=0 is used to determine the mapping RE of the CRS. Furthermore, FIG. 9 illustrates a case where the ePMCH RS is transmitted through one antenna port and v-shift=1 is used to determine the mapping RE of the ePMCH RS.

For example, if a cell 1, a cell 2 and a cell 3 participate in multicast transmission, it is assumed that FIG. 9 illustrates RS mapping results for the cell 1. In this case, a CRS is transmitted in the cell 1 through two antenna ports, and the CRS is mapped in the 1=0 symbol. In the cell 2 and the cell 3, a CRS is mapped in the 1=0 symbol, but a value different from a v-shift value (i.e., 0) for the CRS used in the cell 1 is used.

Furthermore, in the cell 1, an ePMCH RS is transmitted through one antenna port, and the ePMCH RS is mapped in the 1=4, 1=7 and 1=11 symbols. Likewise, the ePMCH RS is also mapped in the 1=4, 1=7 and 1=11 symbols in the cell 2 and the cell 3. In this case, the same value (i.e., 1) as a v-shift value for the ePMCH RS used in the cell 1 is also used in the cell 2 and the cell 3. That is, ePMCH RSs generated as the same sequence in the cell 1, the cell 2 and the cell 3 are overlapped and transmitted.

If v-shifts for a CRS and an ePMCH RS are different, the CRS and the ePMCH RS may be transmitted together in the data region (i.e., PMCH region). The reason for this is that if the v-shifts are different, the CRS and ePMCH are mapped to different REs.

Figure 10:
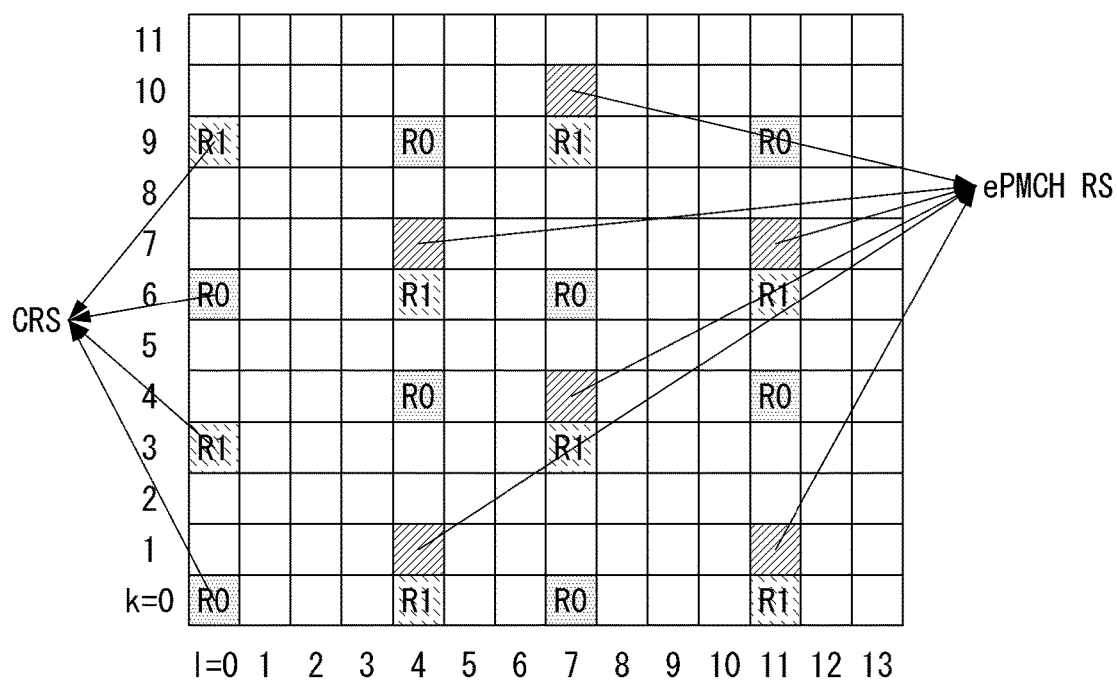
FIG. 10 is a diagram illustrating multicast channel reference signals according to an embodiment of the present invention.

FIG. 10 is a diagram illustrating multicast channel reference signals according to an embodiment of the present invention.

FIG. 10 illustrates a case where a CRS, that is, a first RS, is mapped in all l=0, l=4, l=7 and l=11 symbols and an ePMCH RS, that is, a second RS, is mapped in l=4, l=7 and l=11 symbols.

Furthermore, FIG. 10 shows an example in which the CRS and the ePMCH RS have different v-shifts.

FIG. 10 illustrates a case where the CRS is transmitted through two antenna ports and v-shift=0 is used to determine the mapping RE of the CRS. Furthermore, FIG. 10 illustrates a case where the ePMCH RS is transmitted through one antenna port and v-shift=1 is used to determine the mapping RE of the ePMCH RS.

For example, if a cell 1, a cell 2 and a cell 3 participate in multicast transmission, it is assumed that FIG. 10 illustrates RS mapping results for the cell 1. In this case, the CRS is transmitted through two antenna ports in the cell 1, and the CRS is mapped in all the l=0, l=4, l=7 and l=11 symbols. The CRS is also mapped in all the l=0, l=4, l=7 and l=11 symbols in the cell 2 and the cell 3, but a value different from a v-shift value (i.e., 0) for the CRS used in the cell 1 is used.

Furthermore, the ePMCH RS is transmitted through one antenna port in the cell 1, and the ePMCH RS is mapped in the l=4, l=7 and l=11 symbols. Likewise, the ePMCH RS is also mapped in the l=4, l=7 and l=11 symbols in the cell 2 and the cell 3. In this case, the same value (i.e., 1) as a v-shift value for the ePMCH RS used in the cell 1 is also used in the cell 2 and the cell 3. That is, ePMCH RSs generated from the cell 1, the cell 2 and the cell 3 as the same sequence are overlapped and transmitted.

Furthermore, a base station may notify a UE of information about the location of an RE to which an ePMCH is not mapped because an ePMCH (i.e., data) needs to be transmitted by avoiding the mapping RE locations of CRSs of all cells participating in ePMCH transmission.

In this case, the base station may notify the UE of the location of an RE to which an ePMCH is not mapped every subframe. Information of the RE may have a form of a set of CRS REs. In other words, the base station may notify the UE of the location of an RE to which an ePMCH is not mapped in the form of a set of the CRS REs of all cells participating in ePMCH transmission.

Furthermore, the same type of information may be delivered to transmit an ePMCH by avoiding the CSI-RSs of each cell. That is, a base station may notify a UE of information about the location of an RE to which an ePMCH is not mapped in the form of a set of CSI-RS REs.

Furthermore, exceptionally, the RE of the first symbol (i.e., l=0 symbol) may operate so that it is used by an ePMCH. That is, a first RS (CRS) is not mapped to the first symbol (i.e., l=0 symbol), and a second RS (ePMCH RS) may be mapped to the first symbol.

For example, in a subframe or carrier in which a PDCCH region is not present, an ePMCH RS may be also mapped to the first symbol and operates so that it is used for the demodulation of an ePMCH.

In this case, the ePMCH RS mapped to the PDCCH region may have the same number of antenna ports, v-shift, and RS sequence generation seed as an ePMCH RS mapped to a data region.

In this case, a UE needs to check whether the RS of the first symbol can be used as an ePMCH RS. This may be designated by an eNB.

For example, an eNB may previously notify a UE whether an ePMCH is mapped up to a PDCCH region or is mapped to only a data region in a specific carrier, a specific subframe through an upper layer signal, such as RRC signaling.

Alternatively, the information may also operate in conjunction with the starting symbol of an ePMCH. For example, if an ePMCH is mapped from the first symbol, an ePMCH RS is also mapped to the first symbol. In contrast, if an ePMCH is mapped from other symbol, a UE may recognize that an ePMCH RS is not present in the first symbol.

For another example, if an ePMCH is mapped from the second symbol, an ePMCH RS may be mapped in the first symbol for channel estimation performance improvement. In this case, if a legacy UE performs radio resource management (RRM) measurement in a corresponding subframe, a CRS needs to be transmitted. In this case, the CRS and the ePMCH RS may use different v-shifts.

The starting symbol of an ePMCH may be transmitted through an upper layer signal, such as RRC signaling, or may be dynamically designated through a physical layer signal. For example, the starting symbol of an ePMCH may be configured identically with the starting symbol of a PDSCH through a PCFICH value.

As another technology proposed in the present invention, an RS (i.e., second RS) for demodulating an ePMCH may be defined/configured so that a "h-shift" is applied compared to a first RS (e.g., the CRS) defined in the existing technology.

As illustrated in FIGS. 9 and 10, an RS for an ePMCH to which a different v-shift has been applied compared to a unicast CRS may be defined/configured. However, there is a problem in that flexibility may be very low in assigning the v-shift, not used in a serving cell and surrounding cells, to an RS for an ePMCH when different v-shifts of neighbor cells are considered because the existing CRS itself supports a v-shift.

In order to solve this problem, since an RS for an ePMCH itself is practically an independent new RS (e.g., it cannot be used for channel estimation along with a unicast RS), flexibility can be improved by applying a specific shift configuration (e.g., h-shift) in a form different from the v-shift applied in the existing unicast RS.

For example, such a h-shift value may be set as one of {0, 1, 2, . . . }. When h-shift=0, it means the same location as that of the existing first RS (e.g., CRS). When h-shift=1, it may mean a location shifted (i.e., time-shifted) to the right by one space (e.g., the direction in which a symbol index l increases) from the existing first RS (e.g., CRS) location.

Figure 11:
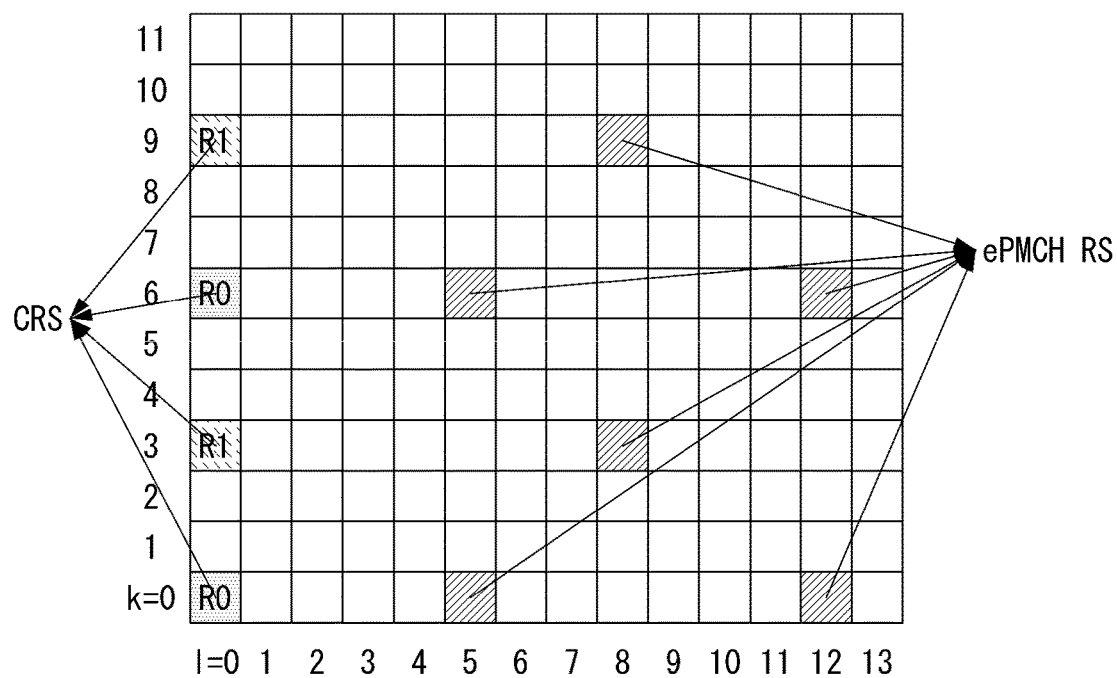
FIG. 11 is a diagram illustrating multicast channel reference signals according to an embodiment of the present invention.

FIG. 11 is a diagram illustrating multicast channel reference signals according to an embodiment of the present invention.

FIG. 11 illustrates a case where a CRS, that is, a first RS, is mapped in an l=0 symbol and an ePMCH RS, that is, a second RS, is mapped in l=5, l=8 and l=12 symbols.

FIG. 11 illustrates a case where the CRS is transmitted through two antenna ports and v-shift=0 is used to determine the mapping RE of the CRS. Furthermore, FIG. 11 illustrates a case where the ePMCH RS is transmitted through one antenna port and h-shift=1 is used to determine the mapping RE of the ePMCH RS.

Furthermore, a specific negative integer value(s) may also be included in candidate values, such as that the h-shift value can be set to one of {−1, 0, 1, 2}. For example, when h-shift=−1, this may mean a location shifted to the left by one space (e.g., the direction in which the symbol index 1 decreases) from the existing first RS (e.g., CRS) location.

Figure 12:
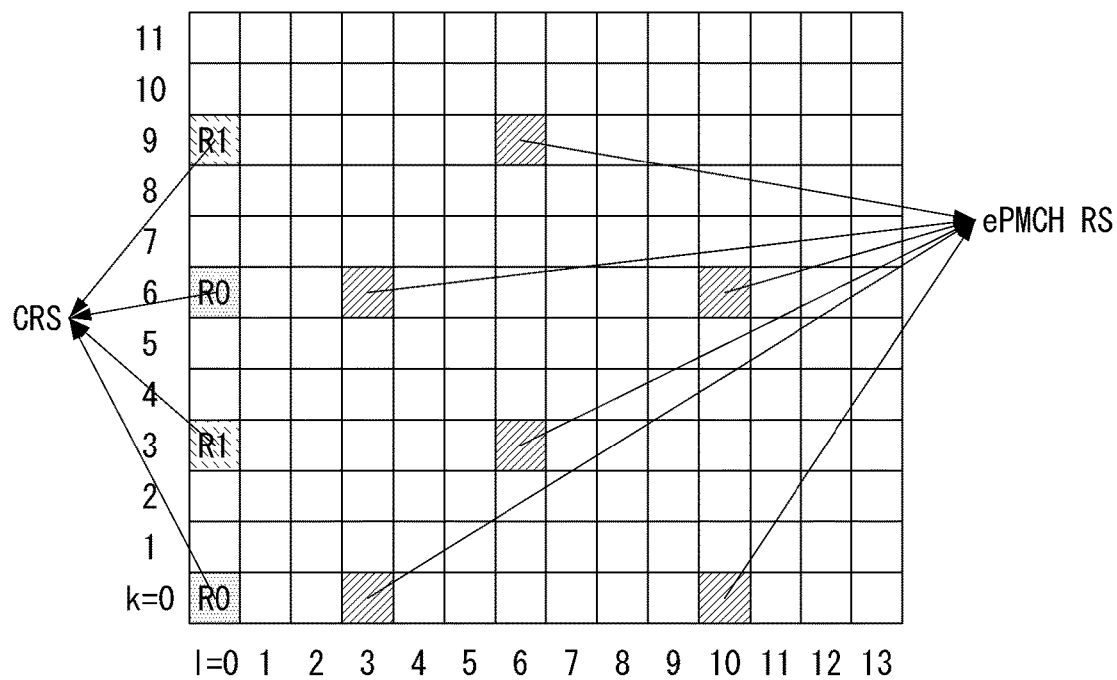
FIG. 12 is a diagram illustrating multicast channel reference signals according to an embodiment of the present invention.

FIG. 12 is a diagram illustrating multicast channel reference signals according to an embodiment of the present invention.

FIG. 12 illustrates a case where a CRS, that is, a first RS, is mapped in an l=0 symbol, and an ePMCH RS, that is, a second RS, is mapped in l=3, l=6 and l=10 symbols.

FIG. 12 illustrates a case where the CRS is transmitted through two antenna ports and v-shift=0 is used to determine the mapping RE of the CRS. Furthermore, FIG. 12 illustrates a case where the ePMCH RS is transmitted through one antenna port and h-shift=−1 is used to determine the mapping RE of the ePMCH RS.

The above-described h-shift may be limited to be applied to only the remaining RSs of a corresponding subframe except an RS mapped to the first symbol to which an RS for an ePMCH is mapped within the subframe (e.g., the first RS symbol row mapped within the subframe for each antenna port of an RS for an ePMCH). That is, in FIGS. 11 and 12, since a time shift is not applied to an ePMCH RS mapped to the first symbol (i.e., l=4 symbol) to which an ePMCH RS within the subframe is mapped, the ePMCH RS may be mapped to the l=4 symbol without any change.

Furthermore, if the RS of the first symbol within such a subframe has been defined/configured to be used for ePMCH demodulation, as in the above description, a h-shift may be limited to be applied except the RS of the first symbol. That is, if an ePMCH RS has been defined/configured so that it is also mapped to the first symbol within the subframe (i.e., l=0 symbol), it may be mapped to the l=0 symbol without any change because a time shift is not applied to an ePMCH RS mapped to the first symbol (i.e., l=0 symbol).

Furthermore, if the h-shift deviates from a corresponding subframe boundary when it is applied to the first symbol location of a specific antenna port appearing in the corresponding subframe, the h-shift may be limited to be not applied.

Furthermore, the existing v-shift may be mixed with the h-shift and configured through an upper layer configuration, such as RRC signaling.

For example, when "h-shift=1" and "v-shift=1" are configured, an RS for a corresponding ePMCH may be mapped to an RE location additionally shifted to the right by one space from the ePMCH RS mapping RE illustrated in FIG. 9. That is, whether to apply the h-shift and/or the v-shift may be configured by a control signal, such as RRC or DCI. More generally, it is evident that a method of applying a specific pre-defined RE pattern in addition to the h-shift may be configured. Such modified schemes are all included in the spirit of the present invention.

In relation to the above-described method of reusing a CRS (and/or CRS location) in order to transmit an ePMCH, the present invention proposes a scheme for increasing the intensity of ePMCH RSs. That is, the ePMCH RS sequence of a specific port may be additionally mapped to an RE that has been previously defined or previously configured in addition to the mapping RE of a unicast RS for a corresponding port.

For example, if an ePMCH is demodulated in a single antenna port (e.g., port 0), a method of transmitting an ePMCH RS sequence itself through a single port, such as the corresponding port 0, but extending an RE location to which such an ePMCH RS sequence is mapped in such a manner that the ePMCH RS sequence is mapped, including the RE location of a conventional CRS port 0 and an RE location where a CRS port 1 could be transmitted.

In other words, there is a difference in that the transmission of the RS sequence of a single antenna port (e.g., port 0) has been increased about two times in RS density compared to the conventional CRS. This may become an alternative for overcoming a disadvantage in that RS density may be insufficient because ePMCH transmission cannot be used for channel estimation along with a conventional unicast RS.

Figure 13:
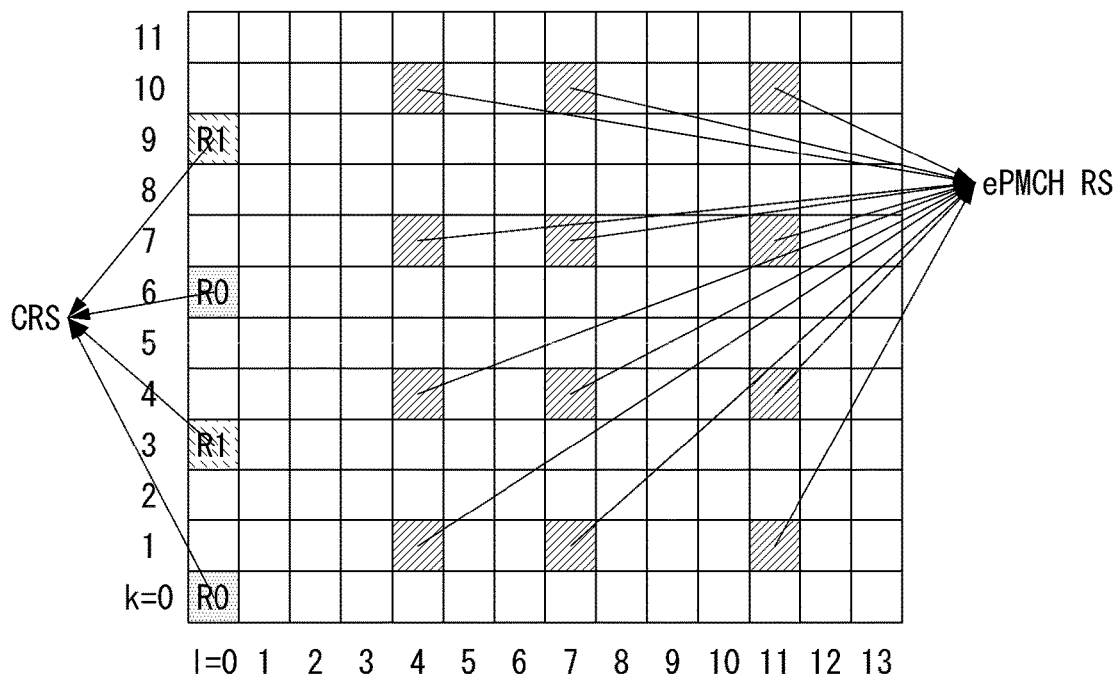
FIG. 13 is a diagram illustrating multicast channel reference signals according to an embodiment of the present invention.

FIG. 13 is a diagram illustrating multicast channel reference signals according to an embodiment of the present invention.

FIG. 13 illustrates a case where a CRS, that is, a first RS, is mapped in an l=0 symbol and an ePMCH RS, that is, a second RS, is mapped in l=4, l=7 and l=11 symbols.

FIG. 13 illustrates a case where the CRS is transmitted through two antenna ports and v-shift=0 is used to determine the mapping RE of the CRS. Furthermore, FIG. 13 illustrates a case where the ePMCH RS is transmitted through one antenna port, but v-shift=1 is used to determine an RE to which the ePMCH RS is mapped.

As in FIG. 13, the ePMCH RS is transmitted through one antenna port, but the ePMCH RS is mapped to all REs to the CRS for the two antenna ports is mapped, thereby being capable of increasing density.

Meanwhile, all similar modified schemes of the present invention capable of increasing RS density, including the above example (e.g., map a single port RS sequence using all REs to which the port 0 and port 1 may be mapped) are included in the spirit of the present invention.

For example, in a single port (e.g., port 0) ePMCH RS sequence, in addition to an RE location to which a single port (C)RS is mapped, additional RE locations may be defined implicitly (e.g., by applying additional mapping according to a previously agreed pattern to a neighboring symbol location or a neighboring subcarrier location while operating in conjunction with RE locations to which the corresponding single port RS is mapped) or explicitly or may be configured in a UE in order to further increase RS density compared to the existing RS density.

One or more of i) the method of mapping an ePMCH by applying a frequency shift (v-shift), ii) the method of mapping an ePMCH by applying a time shift (h-shift), and iii) the method of mapping the ePMCH RS sequence of a specific port to a previously defined or previously configured RE additionally in addition to the mapping RE of a unicast RS for a corresponding port may be combined and used.

A case where a demodulation RS for an ePMCH "uses an RS transmitted at the same location as the existing CRS" has been described. A method of defining/configuring a demodulation RS for an ePMCH in a form in which "an RS transmitted at the same location as the existing DMRS is used" may also be applied by similarly modifying the above-described descriptions.

Figure 14:
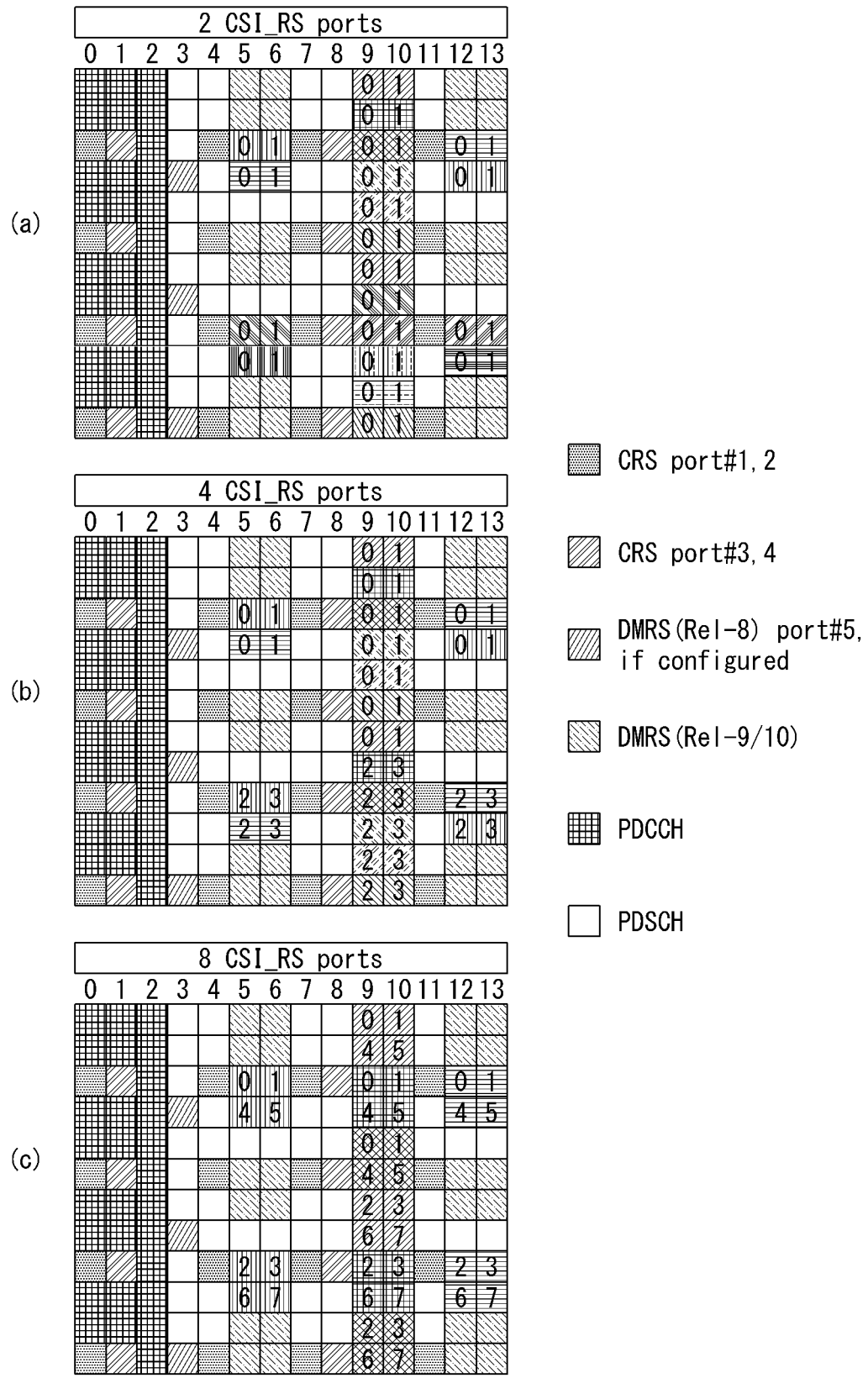
FIG. 14 illustrates reference signal patterns mapped to downlink resource block pairs in a wireless communication system to which the present invention may be applied.

FIG. 14 illustrates reference signal patterns mapped to downlink resource block pairs in a wireless communication system to which the present invention may be applied.

The above-described h-shift configuration may be accompanied when a demodulation RS for an ePMCH uses an RS transmitted at the same location as the existing DMRS.

For example, the RE location of the existing DMRS, such as FIG. 7 (RE marked by "D", refer to Equations 2 and 3) or FIG. 14 (DMRS (Rel-8) RE location or DMRS (Rel-9/10) RE location), may be reused without any change (e.g., h-shift=0 may have been configured), or the existing DMRS location (or part thereof) may be h-shifted to the left or right based on a set h-shift value.

For example, the h-shift value may be defined to be set as one of { . . . , −2, −1, 0} values. For example, when h-shift=−1, a form in which a lower DMRS RE location is shifted to the left by one space (i.e., direction in which a symbol index decreases) may be applied.

As described above, it may be preferred that the DMRS RE location is shifted to the left. In particular, there is has an effect in that performance of channel estimation can be improved (e.g., channel extrapolation performance improvement may be achieved) in a case, such as that where an ePMCH is transmitted from the first symbol of a subframe.

If a demodulation RS for an ePMCH uses an RS transmitted at the same location as the existing DMRS, the v-shift may be applied in addition to the h-shift.

Whether to apply the h-shift and/or the v-shift may be configured in a UE by a control signal, such as RRC or DCI. More generally, it is evident that a method of applying a specific predefined RE pattern in order to determine an RE to which an ePMCH is mapped in addition to the h-shift/v-shift may be configured. All such modified schemes are included in the spirit of the present invention.

Meanwhile, if the CP length of a subframe in which an ePMCH is transmitted is the same as a subframe in which a PDCCH or PDSCH is transmitted, the ePMCH and the PDSCH can be multiplexed more effectively.

A difference with the existing PMCH having a different CP length is described. When a UE initiates reception in a specific subframe, it could not receive a PDSCH if it attempts to receive a PMCH because the UE has to be focused on one CP length only and to receive a signal. However, such a restriction can be solved if an ePMCH having the same CP length as a PDSCH is used.

That is, although a UE has been designated to receive an ePMCH in a specific subframe by an upper layer, the UE may consider that a PDSCH having the same CP length can be transmitted and may perform a corresponding operation. Alternatively, whether a corresponding subframe will be used for ePMCH transmission or will be used for unicast PDSCH transmission through a separate physical layer signal may be dynamically designated. In another meaning, this may mean that whether an ePMCH is present or not is notified by a physical layer signal.

For more flexible allocation of an ePMCH, a base station may dynamically designate the resource allocation of an ePMCH (i.e., one or more resource blocks (RBs) used for ePMCH transmission) through a PDCCH with respect to a UE. In this case, the ePMCH may be transmitted through some RB(s) within one subframe, and a detailed location may be transmitted through a PDCCH that schedules the ePMCH.

Figure 15:
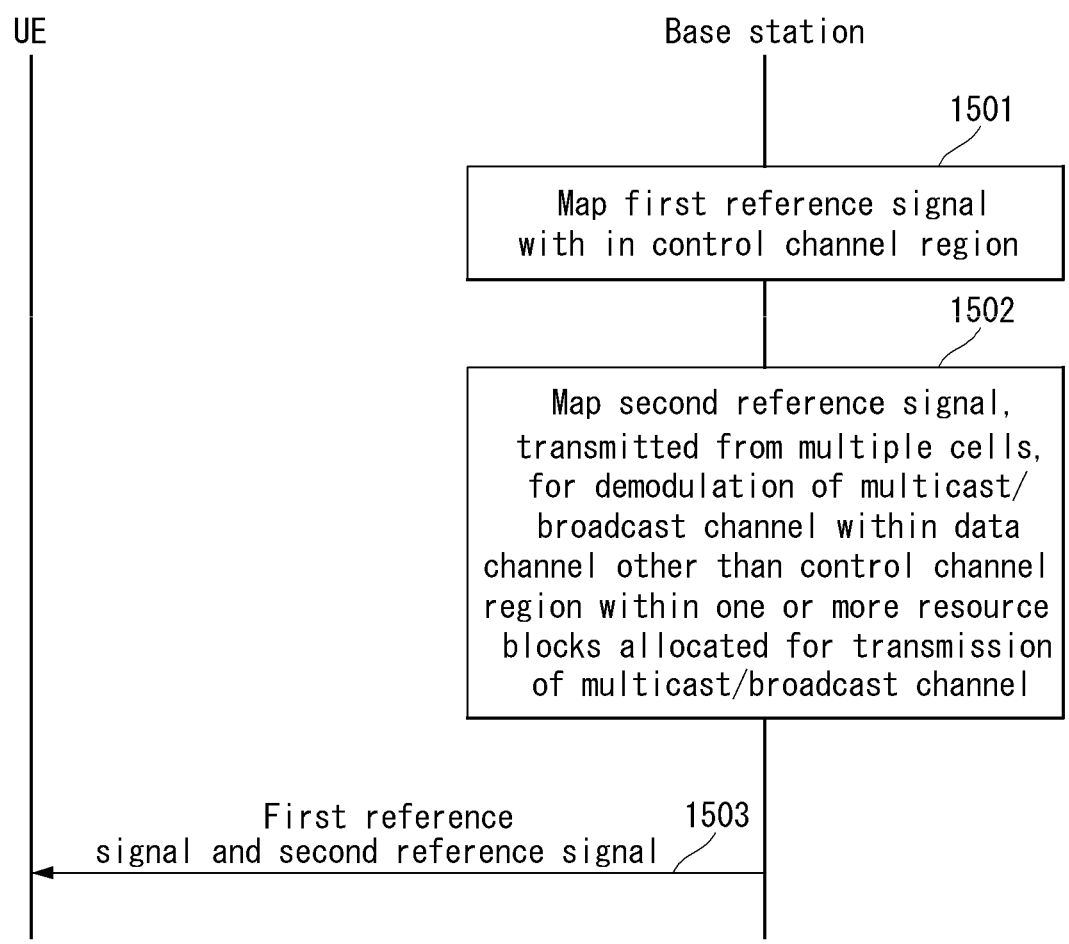
FIG. 15 is a diagram illustrating a multi-cast data transmission method according to an embodiment of the present invention.

FIG. 15 is a diagram illustrating a multi-cast data transmission method according to an embodiment of the present invention.

Referring to FIG. 15, a base station maps a first reference signal within a control channel region (S1501).

That is, the base station may map a first reference signal within a control channel region configured with one or more symbols (e.g., 1 to 4 symbols) used for the transmission of a control channel (e.g., PDCCH) within one subframe.

In this case, the first reference signal means an RS independently transmitted for each cell (participating in multicast/broadcast transmission), and may correspond to a CRS or DMRS, for example.

For example, if a first reference signal is a CRS, the first reference signal may be mapped to the first symbol (i.e., symbol belonging to a control channel region) within a subframe.

Furthermore, the base station may transmit one or more control channels (e.g., PDCCH) in resources other than a resource element used for the transmission of a first reference signal within the control channel region.

In this case, the control channel (e.g., PDCCH) may carry scheduling information for allocating one or more resource blocks to which a multi-cast channel (e.g., ePMCH) carrying multicast/broadcast data transmitted from multiple cells is mapped.

A base station maps a second reference signal, transmitted from multiple cells, for the demodulation of a multicast/broadcast channel within a region other than the control channel region within one or more resource blocks allocated for the transmission of a multicast/broadcast channel (S1502).

In this case, the second reference signal means an RS in which cells participating in multicast/broadcast transmission overlap and transmit the same sequence at the same resource location, and may correspond to an RS for an ePMCH, for example. Furthermore, the second reference signal may be mapped to the same location as a resource to which the first reference signal is mapped, assuming that the first reference signal is mapped to a data channel region.

For example, if a first reference signal is a CRS, a second reference signal may be mapped to the same location as a resource to which the CRS is mapped, assuming that the CRS is mapped to a data channel region.

A seed value for generating the sequence of a first reference signal and a second reference signal, the number of antenna ports in which the first reference signal and the second reference signal are transmitted, a frequency shift value applied to determine resource elements to which the first reference signal and the second reference signal are mapped and/or a time shift value may be determined independently (or differently).

Of course, all cells participating in multicast/broadcast data transmission uses the same seed value in order to generate the sequence of a second reference signal, uses the same number of antenna ports in order to transmit a second reference signal, and uses the same frequency shift value and/or time shift value applied to determine a resource element to which the second reference signal is mapped.

In this case, if a different frequency shift value and/or a different time shift value is applied in order to determine resource elements to which a first reference signal and a second reference signal are mapped, the first reference signal may also be mapped within a data channel region.

Furthermore, since a multicast/broadcast channel needs to be transmitted other than the resource of a first reference signal transmitted from all cells participating in multicast/broadcast data transmission, a base station may transmit, to a UE, information about a resource element to which the first reference signal is mapped in all cells participating in the transmission of multicast/broadcast data for each subframe.

Furthermore, in the case of a subframe or carrier in which a control channel region is not present (e.g., a subframe or carrier in which a PDCCH is not transmitted), a second reference signal may be mapped to the resource location of a control channel region (i.e., one or more symbols configuring the control channel region).

Furthermore, a base station may transmit, to a UE, information about whether a second reference signal is mapped to only a data channel region or is also mapped to the resource location of a control channel region.

In this case, the second reference signal is also mapped to the resource location of the control channel region if a starting symbol where the mapping of a multicast/broadcast channel starts within a subframe is the first symbol within the subframe, and may be implicitly determined so that the second reference signal is mapped to the data channel region only otherwise.

Furthermore, although the multicast/broadcast channel is mapped from the second symbol, the second reference signal may be mapped to the first symbol within the subframe.

If a time shift value is applied to determine a resource element to which a second reference signal is mapped, the time shift value may be applied only in the remaining symbols other than the first symbol to which the second reference signal is mapped within a subframe.

In this case, the first symbol to which the second reference signal is mapped within the subframe means the first symbol of symbols to which the second reference signal is mapped, and may be different depending on whether the second reference signal is mapped to only a data channel region within the subframe or whether the second reference signal is mapped to a control channel region and the data channel region within the subframe.

Furthermore, when a time shift value is applied, the time shift value may not be applied out of a corresponding subframe boundary.

If a second reference signal is transmitted in a first antenna port, the second reference signal may be mapped to a resource element for the first antenna port and a predefined resource element associated with the resource element for the first antenna port. For example, when the second reference signal is transmitted in a port 0, the second reference signal may be mapped to both a resource for the port 0 and a resource for a port 1. Furthermore, when the second reference signal is transmitted in a port 0, the second reference signal may also be mapped to a resource for the port 0 and a symbol neighboring the resource or a subcarrier neighboring the resource.

The base station transmits the first reference signal and the second reference signal to the UE (S1503).

A base station may transmit a control channel and a first reference signal to a UE by mapping the first reference signal within a control channel region in one subframe and mapping the control channel to a resource other than a resource to which the first reference signal within the control channel region is mapped. Furthermore, the base station may transmit a multicast/broadcast channel and a second reference signal to the UE by mapping a first reference signal to a data channel region within a resource block allocated for multicast/broadcast data transmission and mapping the multicast/broadcast channel in a resource other than a resource (and a resource to which the first reference signal transmitted from all cells participating in multicast/broadcast data transmission is mapped) to which the second reference signal within the data channel region is mapped.

The UE that has received the first reference signal and the second reference signal first decodes a control channel transmitted thereto within the control channel region. The UE determines a resource region (i.e., data channel region) allocated for multicast/broadcast data transmission through scheduling information transmitted in the control channel. Furthermore, the UE may obtain multicast/broadcast data by demodulating the multicast/broadcast channel using the second reference signal within the determined data channel region.

General Apparatus to which the Present Invention May be Applied

Figure 16:
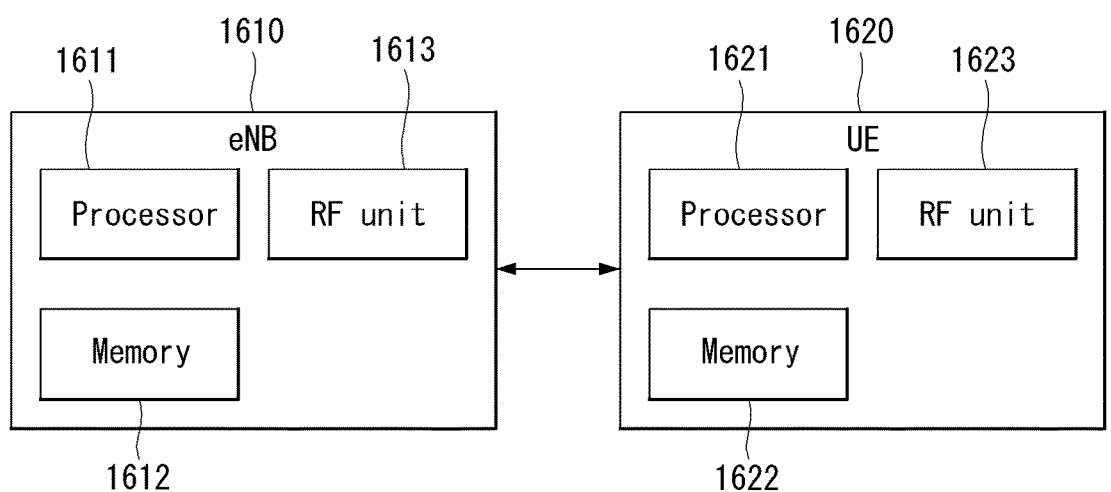
FIG. 16 illustrates a block diagram of a wireless communication apparatus according to an embodiment of the present invention.

FIG. 16 illustrates a block diagram of a wireless communication apparatus according to an embodiment of the present invention.

Referring to FIG. 16, the wireless communication system includes an eNB 1610 and multiple UEs 1620 disposed within the area of the eNB 1610.

The eNB 1610 includes a processor 1611, memory 1612 and a radio frequency unit (RF unit) 1613. The processor 1611 implements the functions, processes and/or methods proposed in FIGS. 1 to 15. The layers of a radio interface protocol may be implemented by the processor 1611. The memory 1612 is connected to the processor 1611 and stores various types of information for driving the processor 1611. The RF unit 1613 is connected to the processor 1611 and transmits and/or receives radio signals.

The UE 1620 includes a processor 1621, memory 1622 and an RF unit 1623. The processor 1621 implements the functions, processes and/or methods proposed in FIGS. 1 to 15. The layers of a radio interface protocol may be implemented by the processor 1621. The memory 1622 is connected to the processor 1621 and stores various types of information for driving the processor 1621. The RF unit 1623 is connected to the processor 1621 and transmits and/or receives radio signals.

The memory 1612, 1622 may be positioned inside or outside the processor 1611, 1621 and may be connected to the processor 1611, 1621 by well-known means. Furthermore, the eNB 1610 and/or the UE 1620 may have a single antenna or multiple antennas.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

An example is applied to the 3GPP LTE/LTE-A system is described primarily, but it is possible to apply the RRC connection method to various wireless communication systems in addition to the 3GPP LTE/LTE-A system.

The invention claimed is:

1. A method for a base station to transmit a reference signal for multicast/broadcast data demodulation in a wireless communication system, the method comprising:

mapping a first reference signal within a control channel region configured with one or more symbols used for control channel transmission within a subframe; and mapping a second reference signal transmitted from multiple cells for demodulation of a multicast/broadcast channel within a data channel region other than the control channel region within one or more resource blocks allocated for transmission of the multicast/broadcast channel carrying multicast/broadcast data transmitted from multiple cells within the subframe, wherein scheduling information for allocating one or more resource blocks to which the multicast/broadcast channel is mapped is transmitted in the control channel, wherein resource elements to which the first reference signal and the second reference signal are mapped are determined based on at least one of a frequency shift value or a time shift value, and wherein, based on the time shift value being applied to determine a resource element to which the second reference signal is mapped, the time shift value is applied to remaining symbols other than a first symbol to which the second reference signal is mapped within the subframe.

2. The method of claim 1, wherein a seed value for generating a sequence of the first reference signal and the second reference signal, a number of antenna ports in which the first reference signal and the second reference signal are transmitted, the frequency shift value and/or the time shift value applied to determine the resource elements to which the first reference signal and the second reference signal are mapped are independently determined.

3. The method of claim 2, wherein the first reference signal is also mapped within the data channel region, based on different frequency shift values and/or time shift values being applied to determine the resource elements to which the first reference signal and the second reference signal are mapped.

4. The method of claim 1, wherein information regarding a resource element to which the first reference signal is mapped, is transmitted to a user equipment in all cells participating in transmission of the multicast/broadcast data for each subframe by the base station.

5. The method of claim 1, wherein in the subframe or carrier in which the control channel region is not present, the second reference signal is mapped to a specific resource region.

6. The method of claim 5, wherein information about whether the second reference signal is mapped to only the data channel region or also mapped to the specific resource region is transmitted to a user equipment by the base station.

7. The method of claim 5, wherein based on a starting symbol, where the mapping of the multicast/broadcast channel within the subframe starts, being a first symbol within the subframe, the second reference signal is also mapped to the specific resource region, and based on the starting symbol not being the first symbol within the subframe, the second reference signal is mapped to only the data channel region, wherein the specific resource region is based on the first symbol within the subframe.

8. The method of claim 1, wherein the time shift value is not applied to a symbol out of a boundary of the subframe when the time shift value is applied.

9. The method of claim 1, wherein based on the second reference signal being transmitted in a first antenna port, the second reference signal is mapped to a resource element for the first antenna port and a predefined resource element associated with the resource element for the first antenna port.

10. The method of claim 1, wherein the first reference signal is a cell-specific reference signal (CRS) or a demodulation reference signal (DMRS).

11. The method of claim 1, wherein a cyclic prefix length of the subframe to which the multicast/broadcast channel is mapped is identical with a physical downlink shared channel (PDSCH).

12. A method for a user equipment to receive a reference signal for multicast/broadcast data demodulation in a wireless communication system, the method comprising:

receiving a first reference signal within a control channel region configured with one or more symbols used for control channel transmission within a subframe; and receiving a second reference signal transmitted from multiple cells for demodulation of a mapped multicast/broadcast channel within a data channel region other than the control channel region within one or more resource blocks allocated for transmission of the multicast/broadcast channel carrying multicast/broadcast data transmitted from multiple cells within the subframe, wherein scheduling information for allocating one or more resource blocks to which the multicast/broadcast channel is mapped is transmitted in the control channel, wherein resource elements to which the first reference signal and the second reference signal are mapped are determined based on at least one of a frequency shift value or a time shift value, and wherein, based on the time shift value being applied to determine a resource element to which the second reference signal is mapped, the time shift value is applied to remaining symbols other than a first symbol to which the second reference signal is mapped within the subframe.

* * * * *